(12) United States Patent
Kim et al.

(10) Patent No.: US 10,503,350 B2
(45) Date of Patent: Dec. 10, 2019

(54) MOBILE TERMINAL

(71) Applicant: LG ELECTRONICS INC., Seoul (KR)

(72) Inventors: Euikyeom Kim, Seoul (KR); Kyungtae Oh, Seoul (KR); Seungju Choi, Seoul (KR); Yoonjung Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 15/578,674

(22) PCT Filed: Aug. 11, 2015

(86) PCT No.: PCT/KR2015/008384
§ 371 (c)(1),
(2) Date: Nov. 30, 2017

(87) PCT Pub. No.: WO2016/195160
PCT Pub. Date: Dec. 8, 2016

(65) Prior Publication Data
US 2018/0173401 A1 Jun. 21, 2018

(30) Foreign Application Priority Data
Jun. 1, 2015 (KR) .................. 10-2015-0077143

(51) Int. Cl.
G06F 3/048 (2013.01)
G06F 3/0481 (2013.01)
H04M 1/725 (2006.01)
G06F 3/01 (2006.01)
G06F 3/0484 (2013.01)
(Continued)

(52) U.S. Cl.
CPC .......... G06F 3/04815 (2013.01); G06F 3/014 (2013.01); G06F 3/0486 (2013.01); G06F 3/0488 (2013.01); G06F 3/04842 (2013.01); G06F 3/04845 (2013.01); G06Q 10/101 (2013.01); H04B 1/3833 (2013.01);
(Continued)

(58) Field of Classification Search
None
See application file for complete search history.

(56) References Cited

U.S. PATENT DOCUMENTS 8,316,450 B2 * 11/2012 Robinson ............... G06Q 30/02
726/26
8,411,085 B2 * 4/2013 Rubin ..................... G06T 19/00
345/419
(Continued)

FOREIGN PATENT DOCUMENTS

JP 2014191831 10/2014
KR 1020020057210 7/2002
(Continued)

OTHER PUBLICATIONS

PCT International Application No. PCT/KR2015/008384, Written Opinion of the International Searching Authority dated Mar. 2, 2016, 38 pages.

Primary Examiner — Tuan A Tran
(74) Attorney, Agent, or Firm — Lee, Hong, Degerman, Kang & Waimey

(57) ABSTRACT

Provided is a mobile terminal which allows pieces of furniture to be virtually arranged. A mobile terminal according to one embodiment of the present invention comprises: a wireless communication unit which is capable of communicating with an external server or an external device; a display unit for displaying an execution screen of a certain application; and a control unit, wherein the execution screen at least comprises: a first area for displaying a first image corresponding to a certain area; a second area for displaying information on each of a plurality of pieces of furniture which can virtually be arranged on the first image; and a third area which includes a chat room for exchanging opinions related to the virtual arrangement of the pieces of furniture on the first image, with a user of at least one predetermined external device on which the certain application is installed.

19 Claims, 24 Drawing Sheets

(51) Int. Cl.
*H04B 1/3827* (2015.01)
*H04L 12/58* (2006.01)
*G06F 3/0488* (2013.01)
*G06F 3/0486* (2013.01)
*G06Q 10/10* (2012.01)
*G06Q 30/02* (2012.01)
*G06Q 50/00* (2012.01)

(52) U.S. Cl.
CPC ............ *H04L 51/04* (2013.01); *H04L 51/046* (2013.01); *H04M 1/725* (2013.01); *H04M 1/72522* (2013.01); *G06F 3/011* (2013.01); *G06F 3/012* (2013.01); *G06F 3/04817* (2013.01); *G06F 2203/04806* (2013.01); *G06F 2203/04808* (2013.01); *G06Q 30/02* (2013.01); *G06Q 50/01* (2013.01); *H04M 2250/52* (2013.01)

(56) References Cited

U.S. PATENT DOCUMENTS

| | | | |
|---|---|---|---|
| 8,751,950 B2* | 6/2014 | Loberg | G06T 15/00 715/771 |
| 9,003,424 B1* | 4/2015 | Mendes Da Costa | H04L 12/1827 709/227 |
| 9,019,266 B2* | 4/2015 | Hoguet | G06Q 10/06 345/419 |
| 9,245,064 B2* | 1/2016 | Loberg | G06F 17/5004 |
| 9,330,503 B2* | 5/2016 | Mital | G06T 19/20 |
| 9,398,078 B1* | 7/2016 | Mendes da Costa | G06F 3/0481 |
| 9,519,407 B2* | 12/2016 | Loberg | G06F 17/5004 |
| 9,536,340 B2* | 1/2017 | Loberg | G06T 15/00 |
| 9,977,844 B2* | 5/2018 | Jovanovic | G06T 15/20 |
| 10,002,208 B2* | 6/2018 | Jovanovic | G06T 15/20 |
| 2009/0113349 A1* | 4/2009 | Zohar | G06Q 30/00 715/852 |
| 2013/0215116 A1* | 8/2013 | Siddique | G06Q 30/0643 345/420 |

FOREIGN PATENT DOCUMENTS

| | | |
|---|---|---|
| KR | 1020070087916 | 8/2007 |
| KR | 101235911 | 2/2013 |
| KR | 1020140060653 | 5/2014 |

\* cited by examiner

FIG. 6
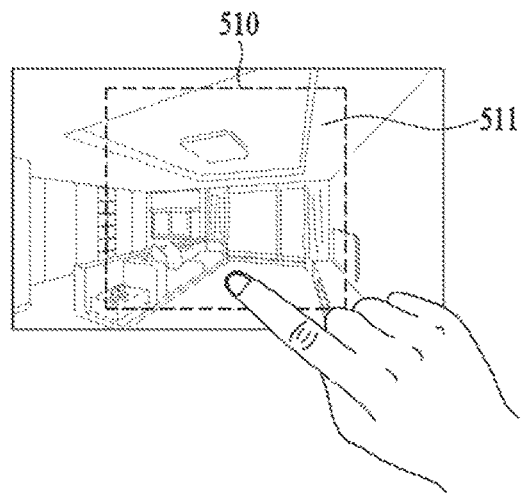
(a)
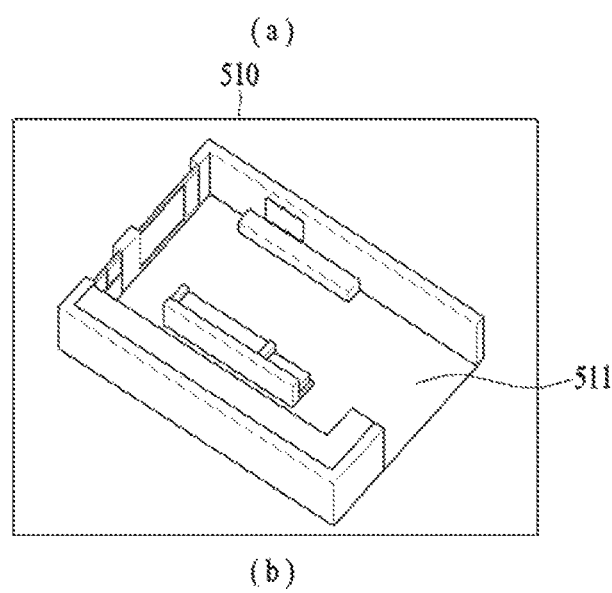
(b)
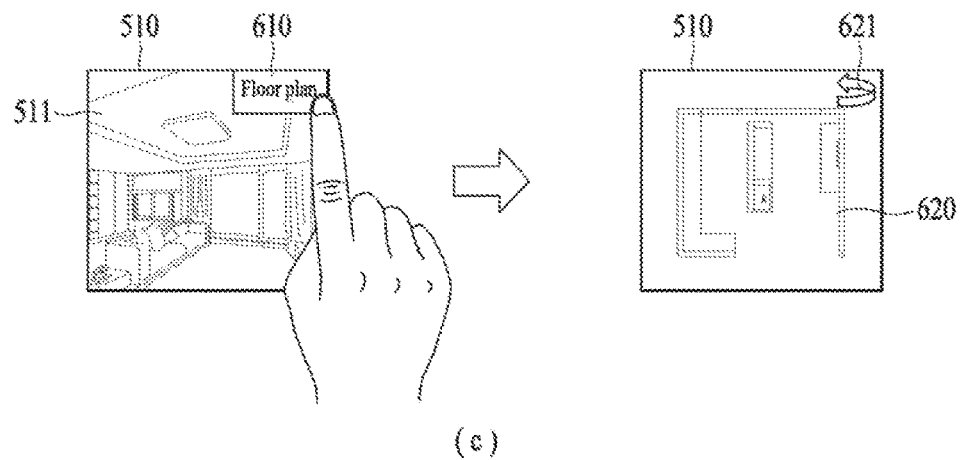
(c)

(a)  (b)

MOBILE TERMINAL

CROSS-REFERENCE TO RELATED APPLICATIONS

This application is the National Stage filing under 35 U.S.C. 371 of International Application No. PCT/KR2015/008384, filed on Aug. 11, 2015, which claims the benefit of earlier filing date and right of priority to Korean Application No. 10-2015-0077143, filed on Jun. 1, 2015, the contents of which are all hereby incorporated by reference herein in their entirety.

TECHNICAL FIELD

The present invention relates to a mobile terminal capable of facilitating the use of the terminal in further consideration of user's convenience.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

The mobile terminals have become increasingly more functional. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

As functions of the terminal are getting diversified, the terminal tends to be implemented as a multimedia player with multiple functions of capturing images or videos, playing back music files or video files, gaming, and receiving broadcasting programs, and the like.

There are ongoing efforts to support and increase the functionality of mobile terminals. Such efforts include software and hardware improvements, as well as changes and improvements in the structural components which form the mobile terminal.

Meanwhile, in recent years, mobile terminals have been increasingly used as a point of reference in selecting furniture in that users can virtually arrange the furniture in an image corresponding to a specific space using the mobile terminals.

DISCLOSURE OF THE INVENTION

Technical Task

Accordingly, an object of the present invention is to address the above-noted and other problems.

Another object of the present invention is to provide a solution for allowing a user to virtually arrange furniture in an image corresponding to a specific space and exchange opinions about the furniture arrangement with many people.

A further object of the present invention is to provide user experience and environment optimized for virtual furniture arrangement.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a mobile terminal, including: a wireless communication unit configured to communicate with an external server or device; a display unit configured to display an execution screen of a specific application; and a controller. In this case, the executions screen at least includes a first area for displaying a first image corresponding to a specific space, a second area for displaying information of each of a plurality of pieces of furniture that can be virtually arranged in the first image, and a third area including a chat room for exchanging opinions about virtual furniture arrangement in the first image with at least one user using a predetermined external device where the specific application is installed.

Advantageous Effects

Accordingly, the mobile terminal according to the present invention provides the following effects and/or advantages According to at least one embodiment of the present invention, it is possible to provide a solution for allowing a user to virtually arrange furniture in an image corresponding to a specific space and exchange opinions about the furniture arrangement with many people.

According to at least one embodiment of the present invention, it is possible to provide user experience and environment optimized for virtual furniture arrangement.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 6 is a diagram illustrating examples of a first image displayed in a first area of an execution screen of the specific application executed by the mobile terminal according to an embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
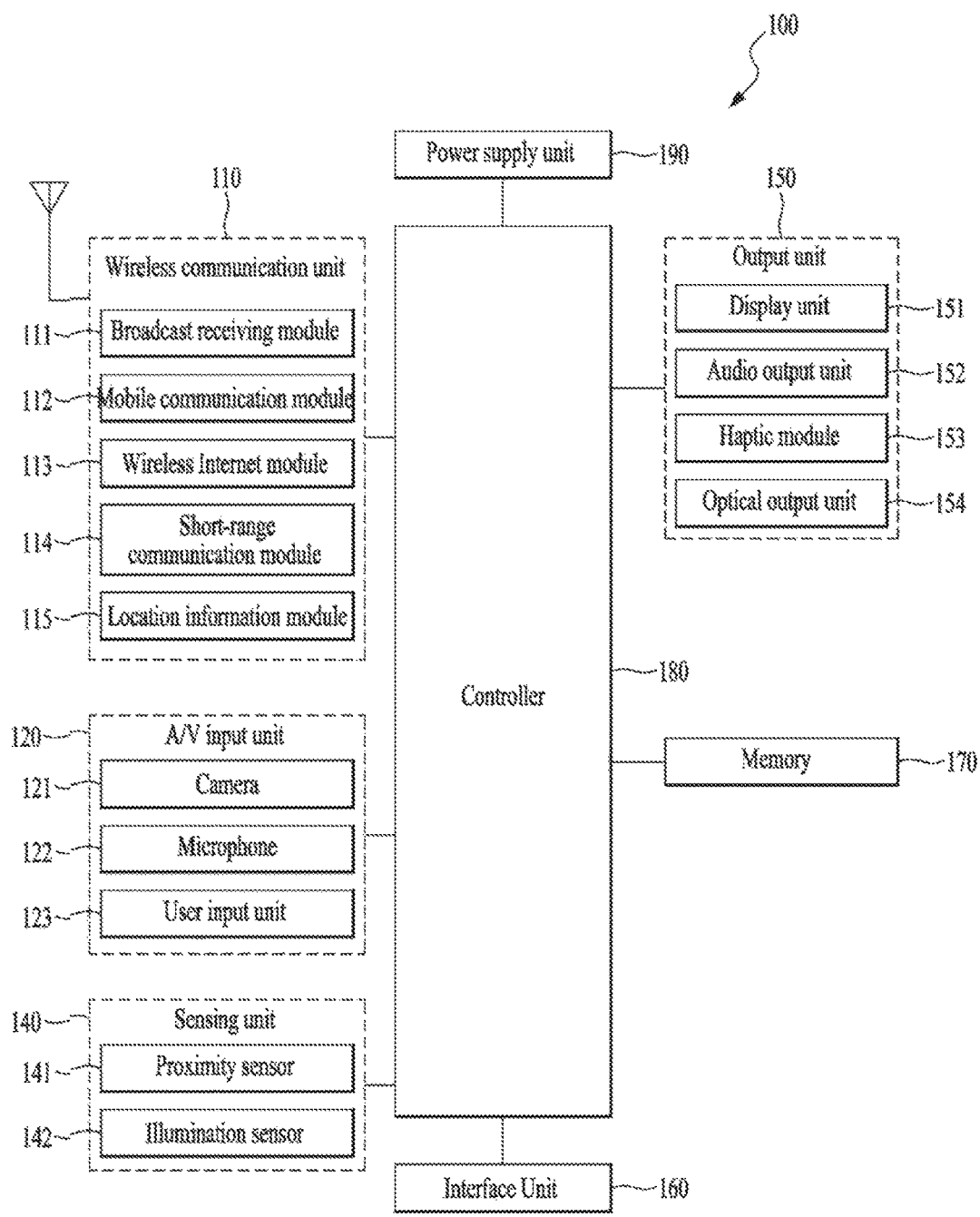
FIG. 1A is a block diagram of a mobile terminal in accordance with the present disclosure.
Figure 1B:
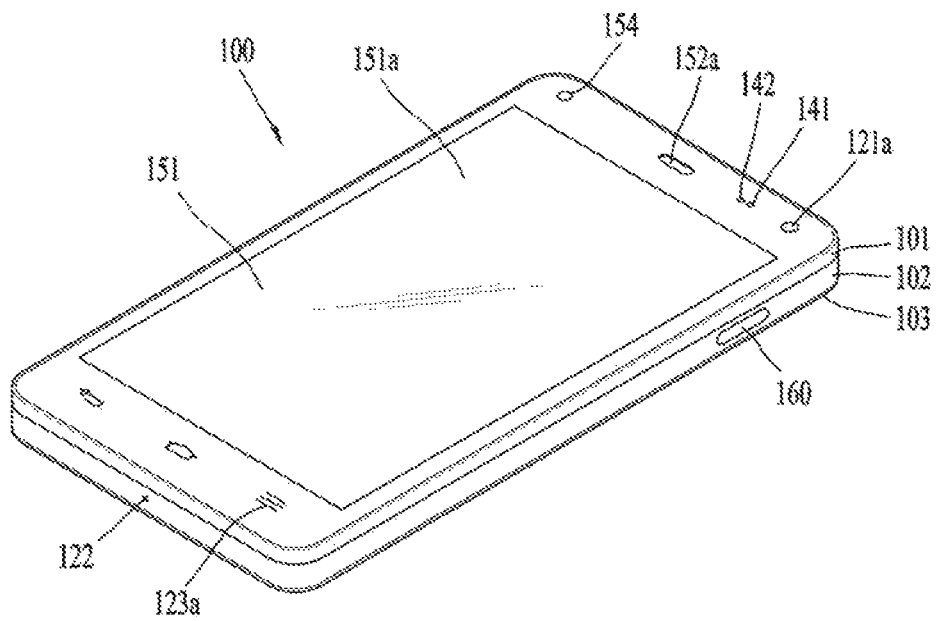
FIGS. 1B and 1C are conceptual views of one example of the mobile terminal, viewed from different directions.
Figure 1C:
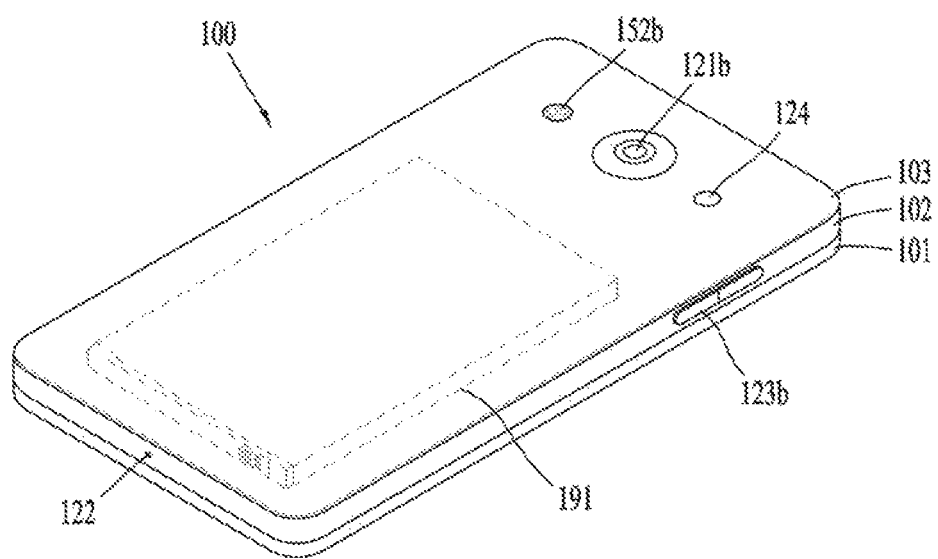

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functionality suitable for a user by processing signals, data, information and the like, which are inputted or outputted by the various components depicted in the above description, or running application programs stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components can operate cooperatively to implement the operations, controls or controlling methods of the mobile terminal according to various embodiments mentioned in the following description. In addition, the operation, control or controlling method of the mobile terminal may be implemented on the mobile terminal by launching at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output units 152a and 152b, the proximity sensor 141, the illumination sensor 142, the optical output module 154, first and second cameras 121a and 121b, first and second manipulation units 123a and 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, information processed by the mobile terminal can be displayed on a flexible display. Hereinafter, details will be described with reference to the accompanying drawings.

Figure 2:
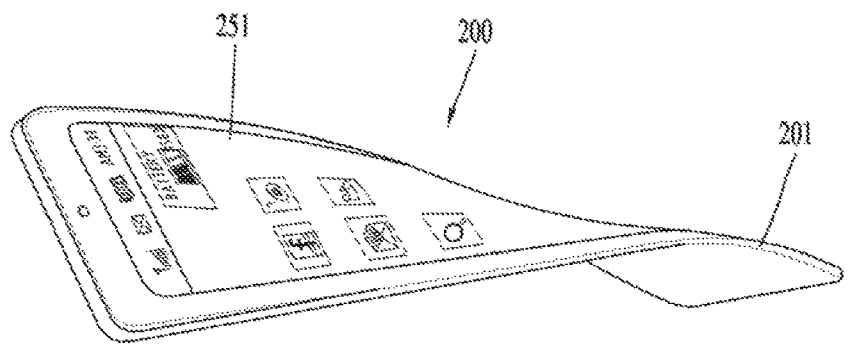
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel)

arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
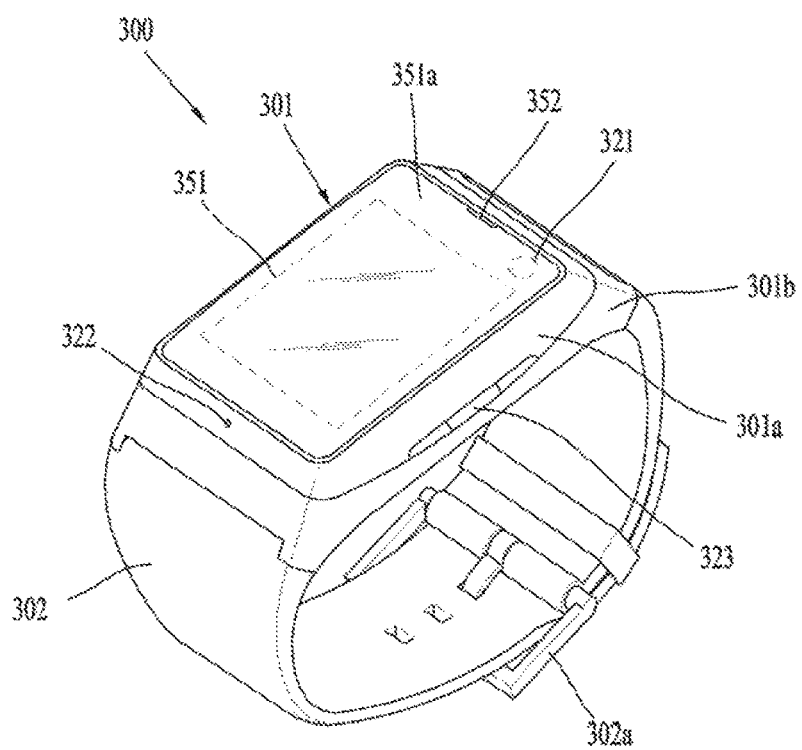
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
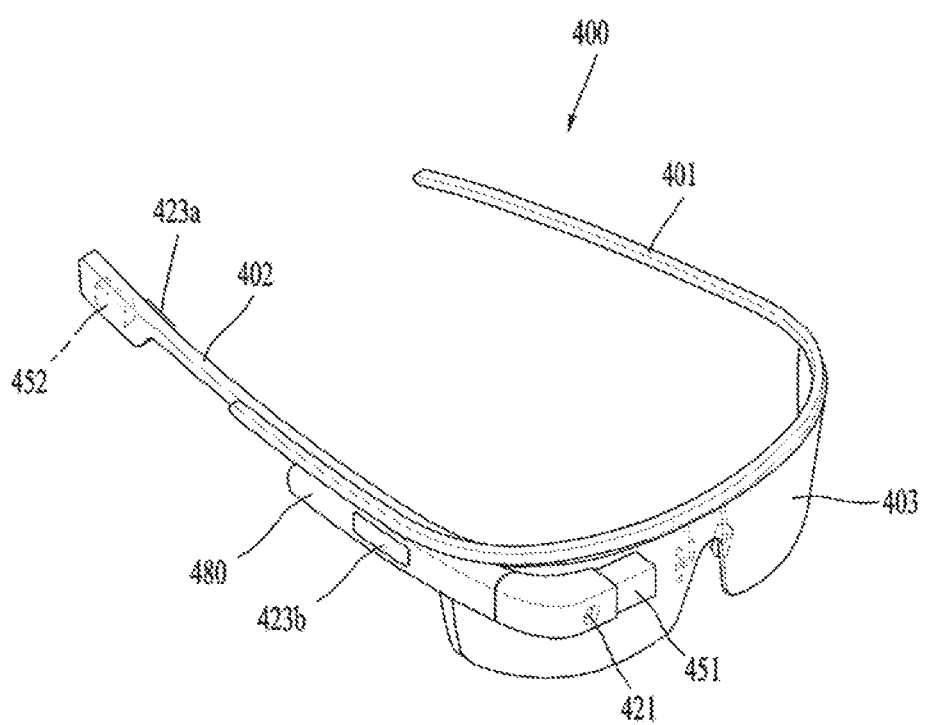
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In addition, the embodiments of the present invention will be described on the premise of the mobile terminal 100 shown in FIGS. 1A to 1C. However, in some embodiments, one of the mobile terminal 200 of FIG. 2, mobile terminal 300 of FIG. 3 and mobile terminal 400 in FIG. 4 may be used.

According the following embodiments of the present invention, a user of the mobile terminal 100 can virtually arrange furniture on an image corresponding to a specific space, which is displayed on the display unit 151, and then exchange opinions about the furniture arrangement with many people. Hereinafter, the embodiments of the present invention will be described in detail with reference to FIGS. 5 to 27.

Figure 5:
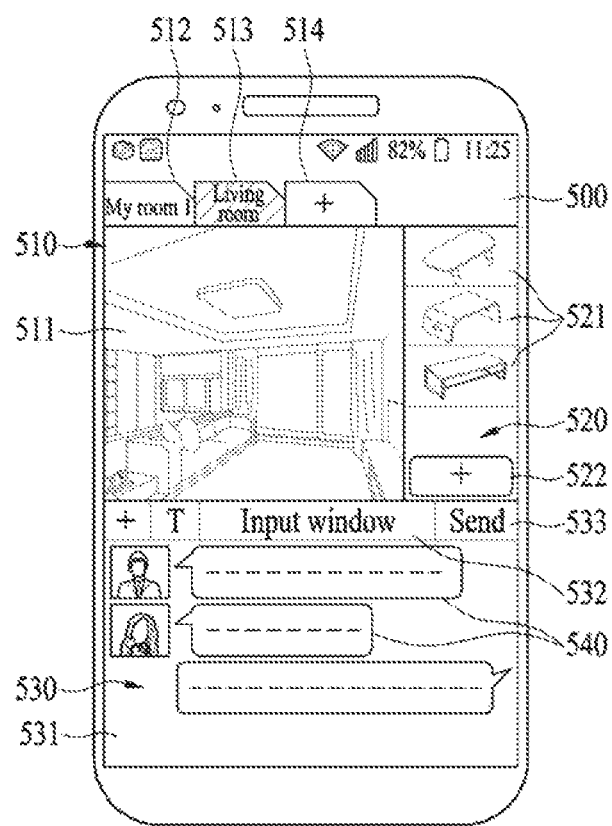
FIG. 5 is a diagram for explaining functions of a specific application executed by a mobile terminal according to an embodiment of the present invention.

FIG. 5 is a diagram for explaining functions of a specific application executed by a mobile terminal according to an embodiment of the present invention.

Referring to FIG. 5, the controller 180 of the mobile terminal 100 displays an execution screen 500 of a specific application on the display unit 151. Here, the specific application is an application having a function of allowing a user to virtually arrange furniture on an image corresponding to a specific space, and it can also provide a function of allowing the user to chat with users of a predetermined external device, where the specific application is installed. In addition, the specific application may be an application provided by a furniture company or an application provided by another company associated with the furniture company.

The specific application may be an application embedded in the mobile terminal 100, an application installed in the mobile terminal 100 when the operating system or firmware is upgraded, or an application downloaded from an external server and installed by the user of the mobile terminal 100.

The execution screen 500 may at least include a first area 510 for displaying a first image 511 corresponding to the specific space, a second area 520 for displaying information 521 on a plurality of pieces of furniture that can be virtually arranged in the first image 510, and a third area 530 including a chat room 531 for exchanging opinions about the virtual furniture arrangement in the first image 510 with at least one user using the predetermined external device where the specific application is installed. Here, the virtual furniture arrangement may mean that an image of furniture is arranged in the first image 510 corresponding to the specific space instead of actually placing the furniture in the specific space.

In some embodiments, the third area 530 including the chat room 531 may be first displayed on the display unit 151 of the mobile terminal 100, and then the execution screen 500 for the virtual furniture arrangement may be displayed while the user is chatting with users of the external device.

The first image 511 may be an image corresponding to the specific space where furniture can be virtually arranged. That is, the first image 511 may be an image corresponding to the space selected by the user of the mobile terminal 100 for the virtual furniture arrangement.

In addition, the first image 511 may include at least one of an image stored in the memory 170 of the mobile terminal 100, a preview image obtained by the camera 121 of the mobile terminal 100, and an image received from an external server or device through the wireless communication unit 110.

Moreover, the first image 511 may be a still image or video image.

Further, the first image 511 may include at least one of a 2-dimensional (2D) image, a 3-dimensional (3D) image, and a 3D reconstruction image. Here, the 3D image may be an image where objects in the image have depth allowing the user to recognize the objects, and the 3D reconstruction image may be an image obtained by capturing images of a specific object in multiple angles and then reconstructing the specific object in 3D. In particular, the 3D reconstruction image may mean an image where the structure, interior, and furniture of a specific space are expressed in 3D.

The first area 510 may include a plurality of taps 512, 513, and 514. In this case, the taps 512 and 513 may be associated with the specific space previously selected for the virtual furniture arrangement, and the tap 514 may be used to select a new specific space for the virtual furniture arrangement. In FIG. 5, it is assumed that the tap 513 is selected by the user and the first image 511 corresponding to the living room is displayed in the first area 510. For example, if the tap 512 is selected by the user, an image corresponding to my room may be displayed in the first area 510. If the tap 514 is selected by the user, an image corresponding to the new specific space selected by the user may be displayed in the first area 510.

The memory 170 can store information of the first image 511. For example, the information of the first image 511 may include at least one of size information of the specific space corresponding to the first image 511, location information of the furniture previously placed in the specific space, shape information of the furniture previously placed in the specific space, and size information of the furniture previously placed in the specific space.

The acquisition and selection of the first image 511 and the information of the first image 511 will be described in detail later with reference to FIGS. 6 to 9.

The second area 520 displays the information 521 on the plurality of pieces of furniture that can be virtually arranged. The furniture information 521 displayed in the second area 520 may include at least one of name information, image information, feature information (shape, texture, etc.), size information, and color information related to the furniture.

When the furniture information 521 is loaded in the second area 520, the controller 180 may store at least part of the furniture information displayed in the second area 520 in the memory 170.

The furniture information 521 displayed in the second area 520 may include at least one of information stored in the memory 170 of the mobile terminal 100, information extracted from an image (or preview image) obtained by the camera 121 of the mobile terminal 100, information received from the external server or device through the wireless communication unit 110, information obtained from an external quick response (QR) code, and information obtained from an external barcode.

The second area 520 may include a menu 522. The menu 522 may correspond to a menu for adding furniture information to be displayed in the second area 520.

The acquisition and selection of the furniture information 521 displayed in the second area 520 will be described in detail later with reference to FIGS. 11 and 12.

The third area 530 includes the chat room 531 for exchanging opinions about the virtual furniture arrangement with many people. The user of the mobile terminal 100 may invite, as members of the chat room 531, users whose opinions about the virtual furniture arrangement the user desires to share among users of the external device where the specific application is installed. In this case, the user of the mobile terminal 100 can be referred to as a master member, and the users of the external device who are invited to the chat room 531 can be referred to as non-master members.

The chat room 531 in the third area 530 includes a chat input window 532 for inputting a text. The user of the mobile terminal 100 can input a chat message to the chat room 531 by inputting a text to the chat input window 532 using a virtual keyboard and selecting a transmission menu 533.

The external server managing the specific application transmits a signal including a text inputted by a member of the chat room 531 to the mobile terminal 100. The controller 180 of the mobile terminal 100 may display, in the chat room 531, a chat window 540 including the text inputted by the member of the chat room 531 based on the signal received through the wireless communication unit 110. By doing so, the user of the mobile terminal 100 can exchange opinions with a plurality of members while virtually arranging furniture in the first image 511.

FIG. 6 is a diagram illustrating examples of a first image displayed in a first area of an execution screen of the specific application executed by the mobile terminal according to an embodiment of the present invention. The features described above with reference to FIG. 5 will be omitted herein to avoid redundant description.

The controller 180 of the mobile terminal 100 displays the execution screen 500 of the specific application on the display unit 151, and the execution screen 500 includes the first area 510 for displaying the first image 511 corresponding to the specific space.

Referring to FIG. 6 (*a*), the first image 511 may be a 2D or 3D image. The user of the mobile terminal 100 can change a part of the first image 511 displayed in the first area 510 by touching a point on the first image displayed in the first area 510 and dragging the point in a predetermined direction. That is, the total size of the first image 511 may be greater than that of a display area of the first area 510. In addition, the user of the mobile terminal 100 can decrease or increase magnification of the first image 511 displayed in the first area 510 by touching two points on the first image 511 displayed in the first area 510 and dragging the two points inside and outside.

Referring to FIG. 6 (*b*), the first image 511 may be a 3D reconstruction image. The controller 180 of the mobile terminal 100 may obtain the 3D reconstruction image from the external server or device or generate the 3D reconstruction image corresponding to the specific space based on at least one of images stored in the memory 170, images obtained by the camera 121, and images transmitted from the external server or device. The memory 170 may store an algorithm for generating a 3D reconstruction image from a plurality of images in advance. Other features are the same as those described with reference to FIG. 6 (*a*), they will not be described again.

Meanwhile, referring to FIG. 6 (*c*), the user of the mobile terminal 100 can check information on the specific space in different angle. For example, the first area 510 for displaying the first image 411 may include a menu option 610 for enabling the user to check a floor plan of the specific space corresponding to the first image 511. When a command for selecting the menu option 610 is inputted, the controller 180 of the mobile terminal 100 may display a second image 620 corresponding to the floor plan of the specific space in the first area 510. The second image 620 may be displayed in the first area 510 instead of the first image 511. Alternatively, the second image 620 may be overlaid with at least part of the first image 511. The controller 180 of the mobile terminal 100 may obtain the second image 620 corresponding to the floor plan of the specific space from the external server or device or generate the second image 620 based on information extracted from the first image 511. When a command for selecting a menu option 621, which is configured to go back to the previous screen, is inputted, the controller 180 of the mobile terminal 100 may eliminate the second image 620 from the first area and then display the first image 511 in the first area 510 again.

Figure 7:
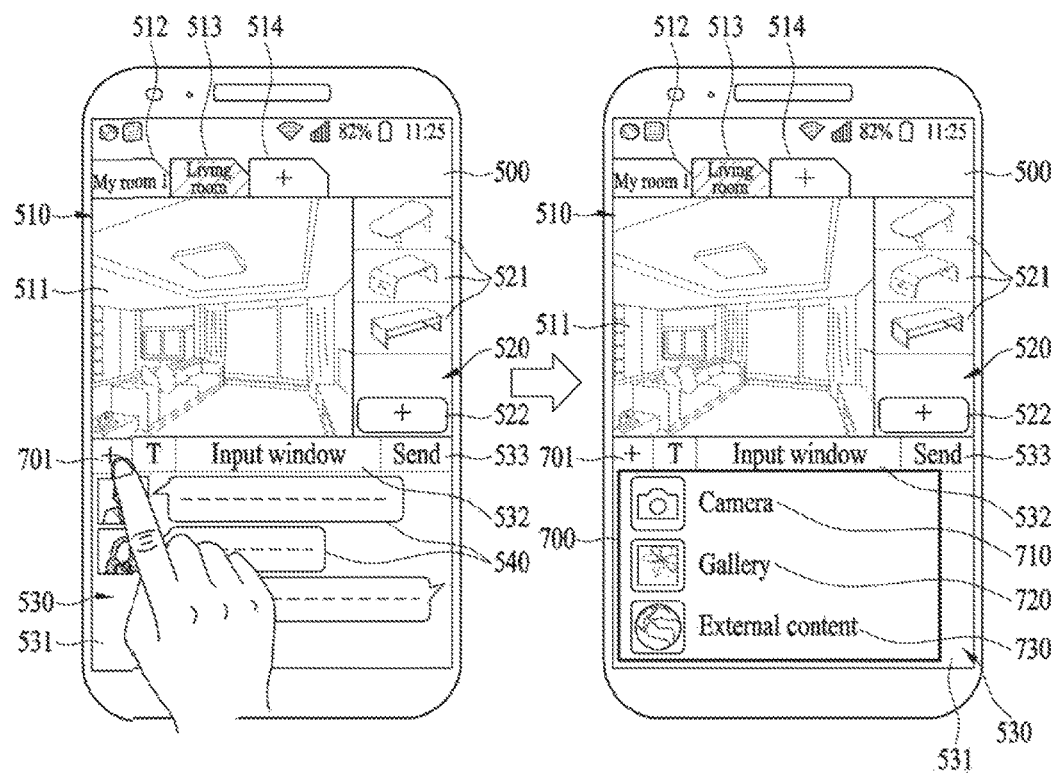
FIG. 7 is a diagram illustrating an example of a method for loading the first image in the first area of the execution screen of the specific application executed by the mobile terminal according to an embodiment of the present invention.

FIG. 7 is a diagram illustrating an example of a method for loading the first image in the first area of the execution screen of the specific application executed by the mobile terminal according to an embodiment of the present invention. The features described above will be omitted herein to avoid redundant description.

The controller 180 of the mobile terminal 100 displays the execution screen 500 of the specific application on the display unit 151, and the execution screen 500 includes the first area 510 for displaying the first image 511 corresponding to the specific space.

In addition, the execution screen 500 includes a menu option 701 corresponding to a function of selecting the first image 511 to be displayed in the first area 510. Through the menu option 701, the user of the mobile terminal 100 may select a specific image as the first image 511 to be displayed in the first area 510 or change an image already displayed in the first area 510 to another image.

When a command for selecting the menu option 701 is inputted, the controller 180 of the mobile terminal 100 may display a GUI 700 including a plurality of menus for selecting the first image 511 to be displayed in the first area 510 on the execution screen 600.

The GUI 700 may include at least one of a first menu 710 for selecting a preview image obtained by a camera 710 or a capture image obtained by capturing the preview image as the first image 511, a second menu 720 for selecting an image previously stored in a gallery application (or the memory 170) as the first image 511, and a third menu 730 for selecting an image received from the external server or device as the first image 511.

If the first menu 710 in the GUI 700 is selected, the controller 180 of the mobile terminal 100 may activate the camera 121 and then display a preview image obtained by the camera 121 on the display unit 151. The user of the mobile terminal 100 may select as the first image 511 the preview image, a capture image obtained by capturing the preview image at a certain time, or an image obtained by combining (or synthesizing) a plurality of capture images.

In addition, if the second menu 720 in the GUI 700 is selected, the controller 180 of the mobile terminal 100 may launch the gallery application and then display an execution screen including a plurality of images on the display unit 151. Here, the plurality of images may include at least one of a still image, video image, 2D image, 3D image, and 3D reconstruction image. Additionally, each of the plurality of images may be an image corresponding to a specific space, and it may be tagged with information on the specific space. Here, the information on the specific space may include at least one of size information of the specific space, location information of the furniture previously placed in the specific space, shape information of the furniture previously placed in the specific space, and size information of an empty area in the specific space.

In some embodiments, when the corresponding image is obtained by the camera 121 of the mobile terminal, the information on the specific space may be extracted by analyzing an RGB image. Alternatively, when the camera 121 is a depth camera, the information on the specific space may be extracted from information obtained by the depth camera.

In addition, in some embodiments, the information on the specific space may be information directly inputted by the user of the mobile terminal 100, information received from the external server or device, or information read from an external QR code or barcode.

Further, if the third menu 730 in the GUI 700 is selected, the controller 180 of the mobile terminal 100 may display, on the display unit 151, an additional menu for selecting the external server from which an image will be downloaded or an additional menu for selecting the external device from which an image will be transmitted. The controller 180 of the mobile terminal 100 may store an image received from the external server or device in the memory 170 and then display as the first image 511 the received image in the first area 510.

Meanwhile, the case in which the user selects the first menu 710 in the GUI 700 will be described in detail later with reference to FIG. 8, and the case in which the user selects the third menu 730 in the GUI 700 will also be described in detail later with reference to FIG. 9.

Figure 8:
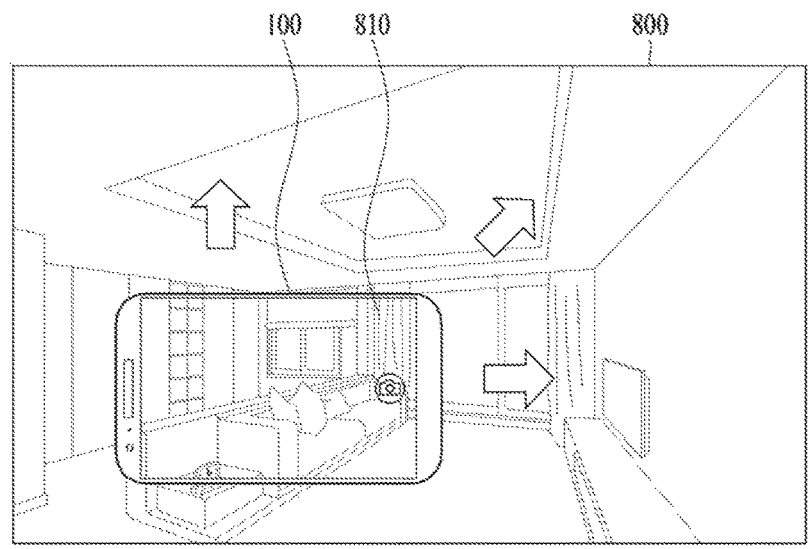
FIG. 8 is a diagram illustrating an example of a method for obtaining the first image on which furniture can be virtually arranged by using a camera of the mobile terminal according to an embodiment of the present invention.

FIG. 8 is a diagram illustrating an example of a method for obtaining the first image on which furniture can be virtually arranged by using a camera of the mobile terminal according to an embodiment of the present invention. The features described above will be omitted herein to avoid redundant description.

If the first menu 710 in the GUI 700 is selected, the controller 180 of the mobile terminal may activate the camera 121 and then display a preview image obtained by the camera 121 on the display unit 151. The user of the mobile terminal 100 may obtain an image corresponding to a specific space 800 by adjusting a location of the camera 121.

The user of the mobile terminal 100 may photograph an image corresponding to a desired portion of the specific space 800 in consideration of an angle of view of the camera 121 and then select the photographed image as the first image 511. Alternatively, the user of the mobile terminal 100 may obtains a plurality of image by moving the camera 121 and then select as the first image an image obtained by combining the obtained plurality of images.

In some embodiments, the camera 121 may include an RGB camera and depth camera. Here, the depth camera can be configured to obtain information on a distance to an object to be photographed.

Based on an image obtained by the RGB camera and distance information obtained by the depth camera, the controller 180 of the mobile terminal 100 may extract object information (e.g., structure, interior, furniture, empty area, and the like of the specific space) from the obtained image and then extract size information of the extracted object information. Thereafter, the controller 180 of the mobile terminal 100 may perform mapping between the obtained image and extracted information to store the obtained image and extracted information in the memory 170. By doing so, the controller 180 of the mobile terminal 100 may grasp at least one of size information of the specific space corresponding to the first image 511, location information of location information of the furniture previously placed in the specific space, shape information of the furniture previously placed in the specific space, and size information of the furniture previously placed in the specific space. In some embodiments, to grasp the information on the specific space, the controller 180 may use information inputted from the user or information received from the external server or device.

Alternatively, in some embodiments, the camera 121 may be implemented using a dual camera (or dual-lens camera), and thus the controller 180 may obtain information on a distance to an object to be photographed based on an image obtained by the dual camera.

Meanwhile, in some embodiments, when the camera 121 does not include the depth camera or dual camera, the controller 180 may extract the above-described information on the specific space by considering the relative sizes of objects in an image obtained by the camera 121.

Figure 9:
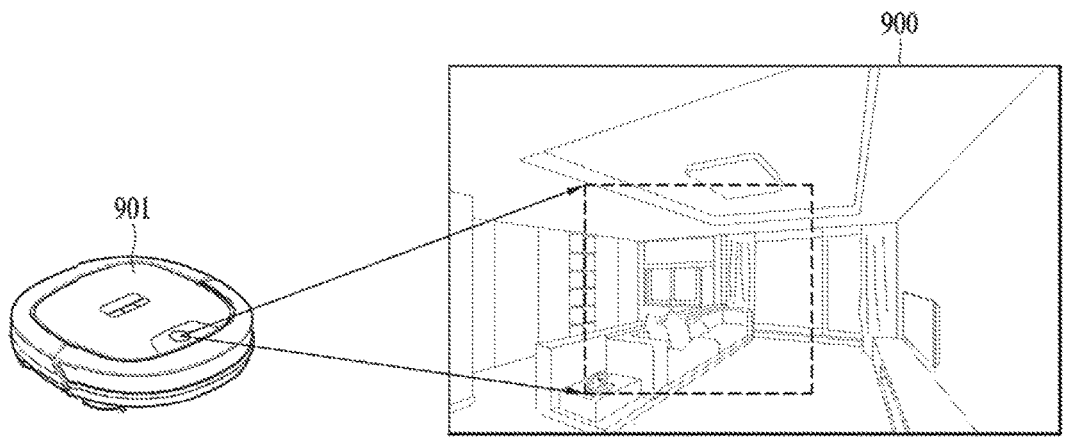
FIG. 9 is a diagram illustrating an example of a method for obtaining, from an external device, the first image on which furniture can be virtually arranged in the mobile terminal according to an embodiment of the present invention.

FIG. 9 is a diagram illustrating an example of a method for obtaining, from an external device, the first image on which furniture can be virtually arranged in the mobile terminal according to an embodiment of the present invention. The features described above will be omitted herein to avoid redundant description.

If the third menu 730 in the GUI 700 is selected, the controller 180 of the mobile terminal 100 may display, on the display unit 151, an additional menu for selecting the external server from which an image will be downloaded or an additional menu for selecting the external device from which an image will be transmitted. In the present embodiment, it is assumed that the user of the mobile terminal 100 selects a robotic vacuum cleaner 901 supporting wireless communication with the mobile terminal 100 as the external device from which an image will be transmitted.

The controller 180 of the mobile terminal 100 receives an image obtained by a camera of the robotic vacuum cleaner 901 in home through the wireless communication unit 110, and the user of the mobile terminal may select the image as the first image 511. In some embodiments, the controller 180 of the mobile terminal 100 may adjust an angle of the camera of the robotic vacuum cleaner 901.

The user of the mobile terminal 100 may select, as the first image 511, the image obtained by the robotic vacuum cleaner 901, a part of the image obtained by the robotic vacuum cleaner 901, or at least part of an image obtained by combining a plurality of images obtained by the robotic vacuum cleaner 901.

For example, the controller 180 of the mobile terminal 100 may extract the above-described information on the specific space by considering the relative sizes of objects in the image obtained by the robotic vacuum cleaner 901. If the robotic vacuum cleaner 901 includes a depth camera, the controller 180 of the mobile terminal 100 may extract the above-described information on the specific space using an RGB image and distance information obtained by the depth camera.

Figure 10:
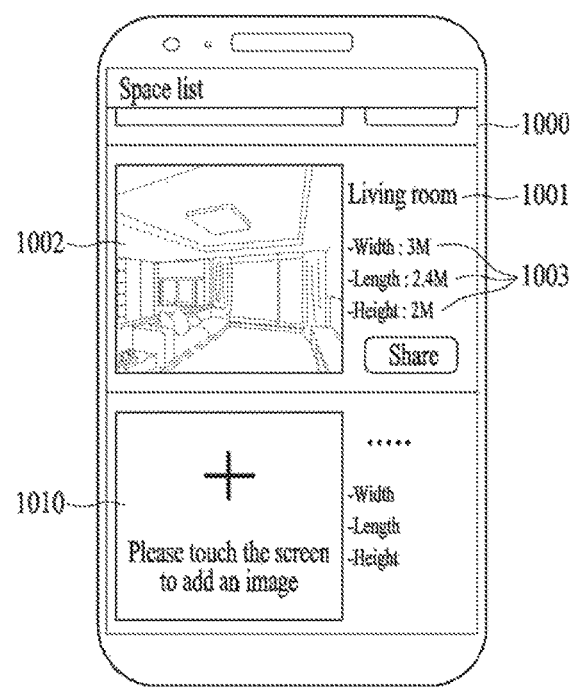
FIG. 10 is a diagram illustrating another example of an execution screen of the specific application executed by the mobile terminal according to the present invention.

FIG. 10 is a diagram illustrating another example of an execution screen of the specific application executed by the mobile terminal according to the present invention. The features described above will be omitted herein to avoid redundant description.

Referring to FIG. 10, the controller 180 of the mobile terminal 100 displays an execution screen 1000 of the specific application on the display unit 151. Here, the execution screen 1000 may include a space list of specific spaces in which furniture will be spaced. The execution screen 1000 may include at least one of a name 1001 of a specific space, an image 1002 corresponding to the specific space, and information 1003 on the specific space for each specific space. In addition, the execution screen 1000 may further include a menu option 1010 for adding a specific space in which furniture can be virtually arranged.

The execution screen 1000 shown in FIG. 10 may correspond to the first area 510 of the execution screen 500 shown in FIG. 5. Alternatively, in some embodiments, when a specific place is selected from the space list on the execution screen 1000, the execution screen 500 shown in FIG. 5 may be displayed on the display unit 151.

Figure 11:
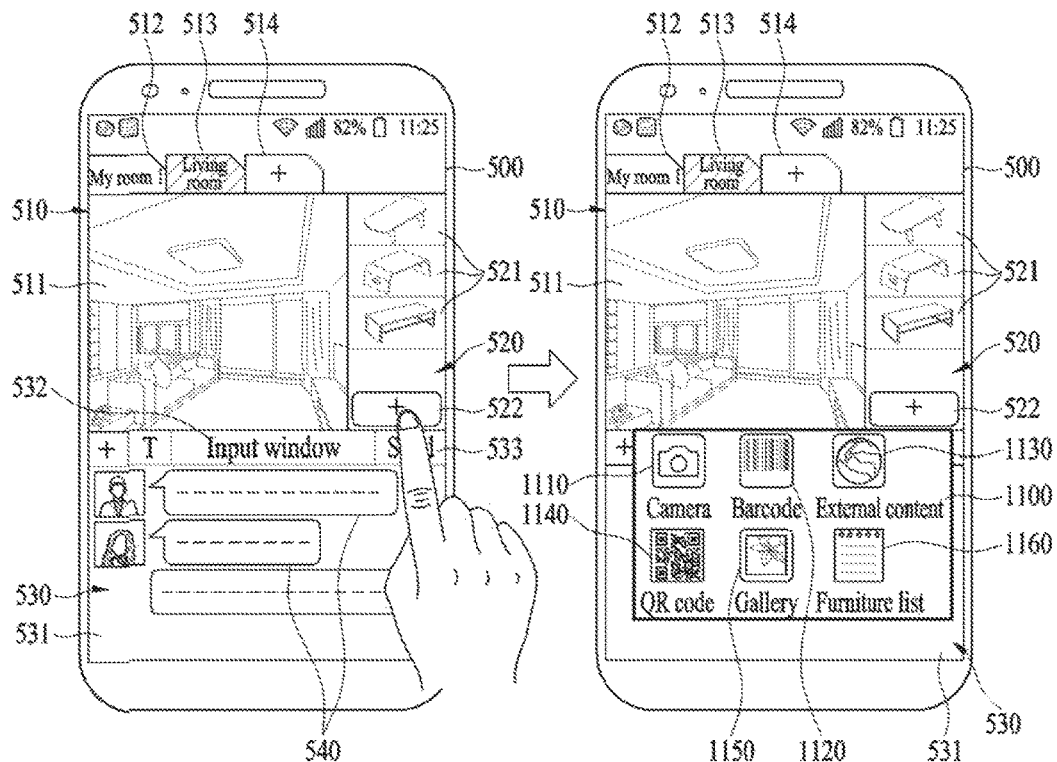
FIG. 11 is a diagram illustrating an example of a method for loading furniture information in a second area of the execution screen of the specific application executed by the mobile terminal according to an embodiment of the present invention.

FIG. 11 is a diagram illustrating an example of a method for loading furniture information in a second area of the execution screen of the specific application executed by the mobile terminal according to an embodiment of the present invention. The features described above will be omitted herein to avoid redundant description.

The controller 180 of the mobile terminal 100 displays the execution screen 500 of the specific application on the display unit 151, and the execution screen 500 includes the second area 520 for displaying the information 521 on the plurality of pieces of furniture that can be virtually arranged in the first image 510.

The second area 520 may include the menu 522 for adding furniture information to be displayed in the second area 520. The user of the mobile terminal 100 may select/add furniture information to be displayed in the second area 520 through the menu 522.

When a command for selecting the menu 522 is inputted, the controller 180 of the mobile terminal 100 may display a GUI 1100 including a plurality of menus for selecting furniture information to be displayed in the second area 520 on the execution screen 500.

The GUI 1100 may include at least one of a first menu 1110 for selecting furniture information obtained from a preview image obtained by a camera 1110 or a capture image obtained by capturing the preview image, a second menu 1120 for selecting furniture information obtained from an external barcode, a third menu 1130 for selecting furniture information transmitted from the external server or device, a fourth menu 1140 for selecting furniture information obtained from an external QR code, a fifth menu 1150 for selecting furniture information previously stored in the gallery application (or the memory 170), and a sixth menu 1160 for selecting furniture information corresponding to a furniture list previously stored in the memory 170. For example, the sixth menu 1160 may be a furniture list provided by a specific furniture company, and more particularly, correspond to a list including several pieces of furniture currently on sale by the specific furniture company or information of several pieces of furniture which were virtually arranged using the specific application.

If the first menu 1110 in the GUI 1100 is selected, the controller 180 of the mobile terminal 100 may activate the camera 121 and then display a preview image obtained by the camera 121 on the display unit 151. The user of the mobile terminal 100 may photograph an image of a desired piece of furniture using the camera 121. The controller 180 of the mobile terminal 100 may extract furniture information based on the obtained image. In this case, the furniture information may include at least one of name information, image information, feature information (shape, texture, etc.), size information, and color information related to the furniture.

For example, the controller 180 of the mobile terminal 100 may extract the name information, feature information, and color information of the furniture by performing edge detection, color detection, and the like on the obtained image and also obtain the size information of the furniture by comparing the relative sizes of objects included in the obtained image.

As another example, when the camera 121 includes a depth camera or is implemented using a dual camera, the controller 180 of the mobile terminal 100 may obtain accurate furniture size information based on distance information obtained by the camera 121. In some embodiments, to grasp furniture information, the controller 180 of the mobile terminal 100 may use information inputted from the user or information received from the external server or device. Further, the controller 180 of the mobile terminal 100 may display at least part of the obtained furniture information in the second area 520.

If the second menu 1120 in the GUI 1100 is selected, the controller 180 of the mobile terminal 100 may activate camera 121. The user of the mobile terminal 100 may photograph an external barcode using the activated camera 121. The external barcode may include information of a specific piece of furniture or information of each of a plurality of pieces of furniture. The controller 180 of the mobile terminal 100 may obtain furniture information included in the barcode by analyzing the barcode included in the obtained image. In addition, the controller 180 of the mobile terminal 100 may display at least part of the obtained furniture information in the second area 520. However, the barcode is merely an example, and it is a matter of course that information of a specific piece of furniture can be obtained from a different form of code, which indicates information.

If the third menu 1130 in the GUI 1100 is selected, the controller 180 of the mobile terminal 100 may display an additional menu for selecting the external server from which furniture information will be downloaded or an additional menu for selecting the external device from which furniture information will be transmitted. The controller 180 of the mobile terminal 100 may store the furniture information received from the external server or device in the memory 170 and then display the received furniture information in the second area 520.

If the second menu 1140 in the GUI 1100 is selected, the controller 180 of the mobile terminal 100 may activate the camera 121. The user of the mobile terminal 100 may photograph an external QR code using the activated camera 121. The external QR code may include information of a specific piece of furniture or information of each of a plurality of pieces of furniture. The controller 180 of the mobile terminal 100 may obtain furniture information included in the QR code by analyzing the QR code included in the obtained image. In addition, the controller 180 of the mobile terminal 100 may display at least part of the obtained furniture information in the second area 520. However, the QR code is merely an example, and it is a matter of course that information of a specific piece of furniture can be obtained from a different form of code, which indicates information.

If the fifth menu 1150 in the GUI 1100 is selected, the controller 180 of the mobile terminal 100 may execute the gallery application and then display an execution screen including a plurality of furniture images on the display unit 151. Here, each of the plurality of furniture images may be tagged with information of a corresponding piece of furniture. The controller 180 of the mobile terminal 100 may display information of furniture corresponding to a furniture image selected by the user in the second area 520.

If the sixth menu 1160 in the GUI 1100 is selected, the controller 180 of the mobile terminal 100 may display a furniture list on the display unit 151. In addition, the controller 180 of the mobile terminal 100 may display information of a piece of furniture selected by the user among a plurality of pieces of furniture included in the displayed furniture list in the second area 520.

Figure 12:
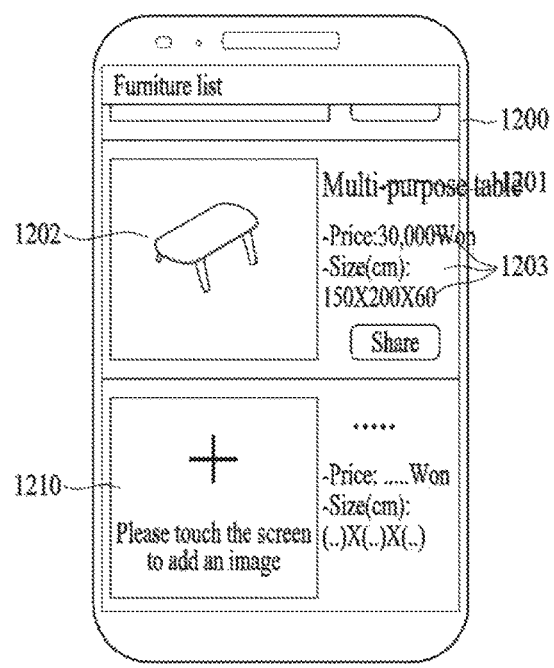
FIG. 12 is a diagram illustrating another example of an execution screen according to an embodiment of the present invention.

FIG. 12 is a diagram illustrating another example of an execution screen according to an embodiment of the present invention. The features described above will be omitted herein to avoid redundant description.

Referring to FIG. 12, the controller 180 of the mobile terminal 100 displays an execution screen 1200 of the specific application on the display unit 151. The execution screen 1200 may include a furniture list including pieces of furniture that can be virtually arranged. The execution screen 1200 may include at least one of a name 1201 of a specific piece of furniture, an image 1202 of the specific piece of furniture, and information 1203 on the specific piece of furniture (e.g., cost information, size information, color information, etc.) for each specific piece of furniture. In addition, the execution screen 1200 may further include a menu option 1210 for adding a specific piece of furniture that can be virtually arranged.

The execution screen 1200 shown in FIG. 12 may correspond to the second area 520 of the execution screen 500 shown in FIG. 5. Alternatively, in some embodiments, when a specific piece of furniture is selected from the furniture list on the execution screen 1200, the execution screen 500 shown in FIG. 5 may be displayed on the display unit 151.

Figure 13:
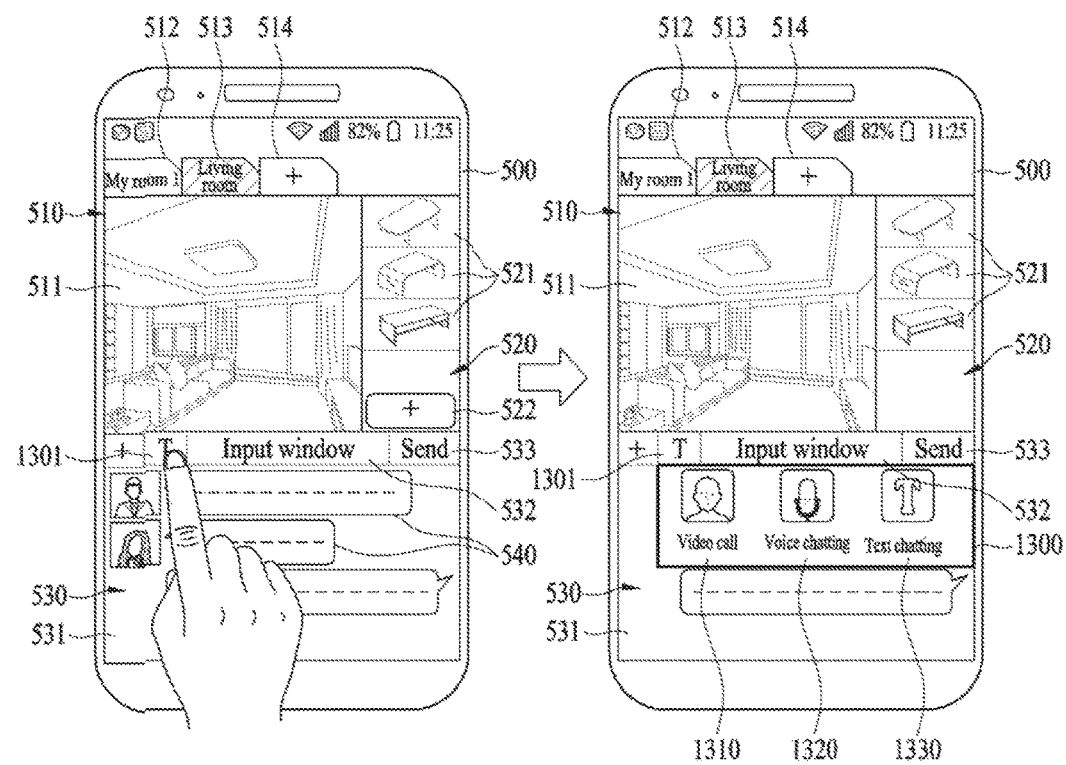
FIG. 13 is a diagram illustrating an example of a method for exchanging opinions about virtual furniture arrangement in the mobile terminal according to an embodiment of the present invention.

FIG. 13 is a diagram illustrating an example of a method for exchanging opinions about virtual furniture arrangement in the mobile terminal according to an embodiment of the present invention. The features described above will be omitted herein to avoid redundant description.

The controller 180 of the mobile terminal 100 displays the execution screen 500 of the specific application on the display unit 151, and the execution screen 500 includes the third area 530 including the chat room 531 for exchanging opinions about the virtual furniture arrangement in the first image 510 with at least one user using the predetermined external device where the specific application is installed.

The third area 530 may include a menu option 1301 for selecting a method for exchanging opinions with members invited to the chat room 531. The user of the mobile terminal 100 may select/change the method for exchanging opinions with members invited to the chat room 531 through the menu option 1301.

When a command for selecting the menu option 1301 is inputted, the controller 180 of the mobile terminal 100 may display a GUI 1300 including a plurality of menus related to the exchange of opinions on the execution screen 500.

The GUI 1300 may include at least one of a first menu 1310 for selecting a video call to exchange opinions, a second menu 1320 for selecting a voice call to exchange opinions, and a third menu 1330 for selecting a text chat to exchange opinions.

Figure 14:
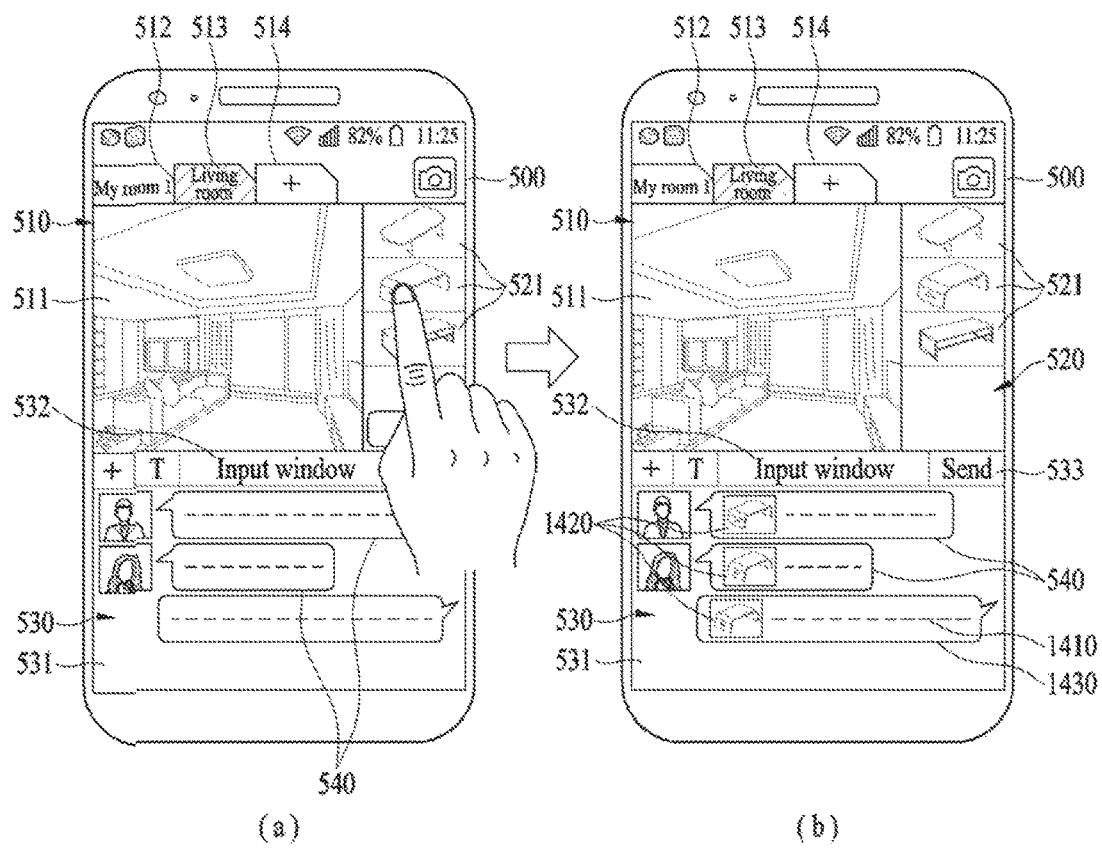
FIG. 14 is a diagram illustrating an example of a method for displaying furniture, of which virtual arrangement is currently discussed by chat room members, on the screen of the mobile terminal according to an embodiment of the present invention.

FIG. 14 is a diagram illustrating an example of a method for displaying furniture, of which virtual arrangement is currently discussed by chat room members, on the screen of the mobile terminal according to an embodiment of the present invention. The features described above will be omitted herein to avoid redundant description.

Referring to FIG. 14 (*a*), the controller 180 of the mobile terminal 100 may detect a first signal for selecting information of a first piece of furniture from the information 521 of the plurality of pieces of furniture displayed in the second area 520 of the execution screen 500. For example, the first signal may correspond to a touch input of touching the information 521 on the first piece of furniture selected from the information 521 on the plurality of pieces of furniture one time.

In addition, referring to FIG. 14 (b), when a text is inputted to the chat input window 532 through the virtual keyboard, the controller 180 of the mobile terminal 100 may display first information 1410 corresponding to the inputted text and second information 1420 corresponding to at least part of the selected information 521 on the first piece of furniture in the chat room 531. In some embodiments, the first information 1410 and second information 1420 may be displayed on a single chat window 1430. By doing so, the members invited to the chat room 531 can easily know which furniture is currently discussed for its virtual arrangement. For instance, the second information 1420 may be an image of the first piece of furniture.

Similarly, the controller 180 of the mobile terminal 100 may receive third information corresponding to a specific piece of furniture and fourth information corresponding to a relevant text from an external device, i.e., a specific member in the chat room 531 through the wireless communication unit 110, and then display the third and fourth information in the chat room 531 by associating the information with the specific member. That is, the members in the chat room 531 can share the executions screen 500 using their own devices, select information of a specific piece of furniture from the furniture information 521 displayed in the second area 520, and input relevant texts in order to exchange opinions about the specific piece of furniture from with each other.

Alternatively, in some embodiments, the controller 180 of the mobile terminal 100 may recognize, as the exchange of opinions about arrangement of the first piece of furniture, texts received before information of a different piece of furniture is newly selected after selection of the information 521 on the first piece of furniture from the furniture information 521 displayed in the second area 520. Thus, unless a random member in the chat room 531 selects information of a different piece of furniture from the furniture information 521 displayed in the second area 520, the controller 180 of the mobile terminal 100 may automatically display texts, which has been received after selection of the information 521 on the first piece of furniture from the from the furniture information 521 displayed in the second area 520, together with the second information 1420.

Further, in some embodiments, although not shown in the drawings, the controller 180 of the mobile terminal 100 may recognize a predetermined first text (e.g., 'second table' or 'hardwood table') from texts displayed in the chat room. If the recognized first text may correspond to the information of the first piece of furniture selected from the furniture information 521 displayed in the second area 520, the controller 180 of the mobile terminal 100 may display the second information 1420 corresponding to the at least part of the information of the first piece of furniture together with the text in the chat room 531 as shown in FIG. 14 (b). That is, according to the present embodiment, the members in the chat room 531 do not need to separately select information of a piece of furniture to share their opinions.

In some embodiments, the controller 180 of the mobile terminal 100 can provide a function of collecting and displaying texts related to the virtual furniture arrangement.

Hereinafter, with reference to FIGS. 15 to 24, a description will be given of examples of a method for virtually arranging furniture in the first image 511. Here, the furniture arrangement may include changing a position of furniture, changing a rotation angle of furniture, changing color of furniture, etc.

Figure 15:
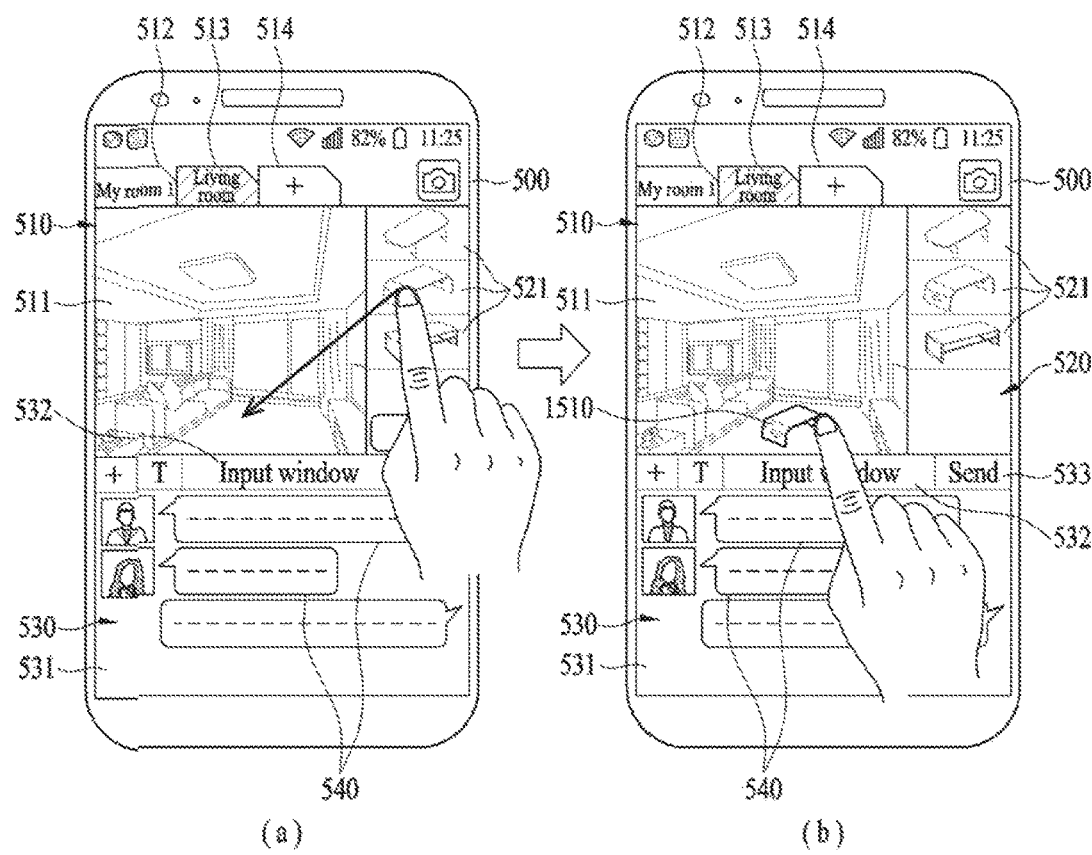
FIG. 15 is a diagram illustrating a method for virtually placing furniture in the first image of the mobile terminal according to an embodiment of the present invention.

FIG. 15 is a diagram illustrating a method for virtually placing furniture in the first image of the mobile terminal according to an embodiment of the present invention.

Referring to FIG. 15 (a), the controller 180 of the mobile terminal 100 detects the first signal for selecting the information of the first piece of furniture from the furniture information 521 displayed in the second area 520. For example, the first signal may correspond to a signal of touching information of a specific piece of furniture from the furniture information 521 displayed in the second area 520 and dragging it into the first area 510.

Referring to FIG. 15 (b), the controller 180 of the mobile terminal 100 may display an image 1510 of the first piece of furniture corresponding to the information 521 on the first piece of furniture in the first image 511. The image 1510 of the first piece of furniture may be an image included in the information of the first piece of furniture displayed in the second area 520 or an image stored in the memory 1710 relating to the information of the first piece of furniture displayed in the second area 520. For example, the image 1510 of the first piece of furniture may be a 3D reconstruction image.

When displaying the image 1510 of the first piece of furniture on the first image 511, the controller 180 may adjust a size of the image 1510 of the first piece of furniture based on information of the first piece of furniture stored in the memory 1710 (e.g., a size of the first piece of furniture) and information on the specific space corresponding to the first image 511 (e.g., a size of the specific space, a size of previously placed furniture, etc.).

The user of the mobile terminal 100 may change a location of the image 1510 of the first piece of furniture in the first image 511 and rotate the image 1510 of the first piece of furniture. When the image 1510 of the first piece of furniture is a 3D reconstruction image, the user of the mobile terminal 100 may change a rotation angel of the image 1510 of the first piece of furniture in the first image 511.

When the controller 180 of the mobile terminal 100 displays the image 1510 of the first piece of furniture, the controller 180 of the mobile terminal 100, if the location of the image 1510 of the first piece of furniture in the first image 511 is changed based on the information of the first piece of furniture stored in the memory 1710 (e.g., the size of the first piece of furniture) and the information on the specific space corresponding to the first image 511 (e.g., the size of the specific space, the size of the previously placed furniture, etc.), the controller 180 of the mobile terminal 100 may properly adjust the size of the image 1510 of the first piece of furniture.

For example, the controller 180 of the mobile terminal 100 may change at least one of the location, size, and rotation angle of the image 1510 of the first piece of furniture in the first image 511 according to at least one of a first signal for changing the location of the image 1510 of the first piece of furniture in the first image 511 and a second signal for rotating the image 1510 of the first piece of furniture in the first image 511.

For instance, when the first image 511 is a 3D reconstruction image, the controller 180 of the mobile terminal 100 may determine at least one of the location (i.e., $X_P$, $Y_P$, $Z_P$) of the image 1510 of the first piece of furniture and the angle (i.e., $X_d$, $Y_d$, $Z_d$) of the image 1510 of the first piece of furniture with respect to the coordinate of the first image 511 according to at least one of the first and second signals. Since both the first image 511 and the image 1510 of the first piece of furniture are 3D construction images, the location (i.e., $X_P$, $Y_P$, $Z_P$) of the image 1510 of the first piece of furniture and the angle (i.e., $X_d$, $Y_d$, $Z_d$) of the image 1510 of the first piece of furniture may be expressed as vectors. When changing arrangement of the image 1510 of the first piece of furniture in the first image 511 using the angle (i.e., $X_d$, $Y_d$, $Z_d$) of the image 1510 of the first piece of furniture, the controller 180 of the mobile terminal 100 may further use information on a distance from the origin of the coordinate of the first image 511 to the center point of the image 1510 of the first piece of furniture.

As another example, when the first image 511 is either a 2D image (still image) or 3D image (still image), the controller 180 of the mobile terminal 100 may determine at least one of the location (i.e., $X_P$, $Y_P$) of the image 1510 of the first piece of furniture and the angle (i.e., $X_d$, $Y_d$, $Z_d$) of the image 1510 of the first piece of furniture with respect to the resolution of the first image 511 according to at least one of the first and second signals.

As a further example, when the first image 511 is either a 2D image (video) or 3D image (video), the controller 180 of the mobile terminal 100 may determine at least one of the location (i.e., $X_P$, $Y_P$) of the image 1510 of the first piece of furniture and the angle (i.e., $X_d$, $Y_d$, $Z_d$) of the image 1510 of the first piece of furniture with respect to the resolution of the current frame of the first image 511 according to at least one of the first and second signals.

The controller 180 of the mobile terminal 100 may control the wireless communication unit 110 to transmit information of the first image 511 and information of the image 1510 of the first piece of furniture to devices of the members in the chat room 531 either periodically or aperiodically. Thus, the members in the chat room 531 may share the virtual furniture arrangement situation and exchange opinions. In this case, the devices of the members in the chat room 531 may display the first area 510 to third area 530 in the same/similar manner.

In some embodiments, when a certain member in the chat room 531 except the user of the mobile terminal 100 virtually arrange the image 1510 of the first piece of furniture in the first image 511, the controller 180 of the mobile terminal 100 may arrange the image 1510 of the first piece of furniture in the first image 511 based on data transmitted from a mobile terminal of the certain member.

Meanwhile, according to an embodiment of the present invention, the mobile terminal 100 may capture an image of the situation where the image 1510 of the first piece of furniture is placed in the first image 511 and then store the image in the memory 170. This will be described with reference to FIGS. 16 and 17.

Figure 16:
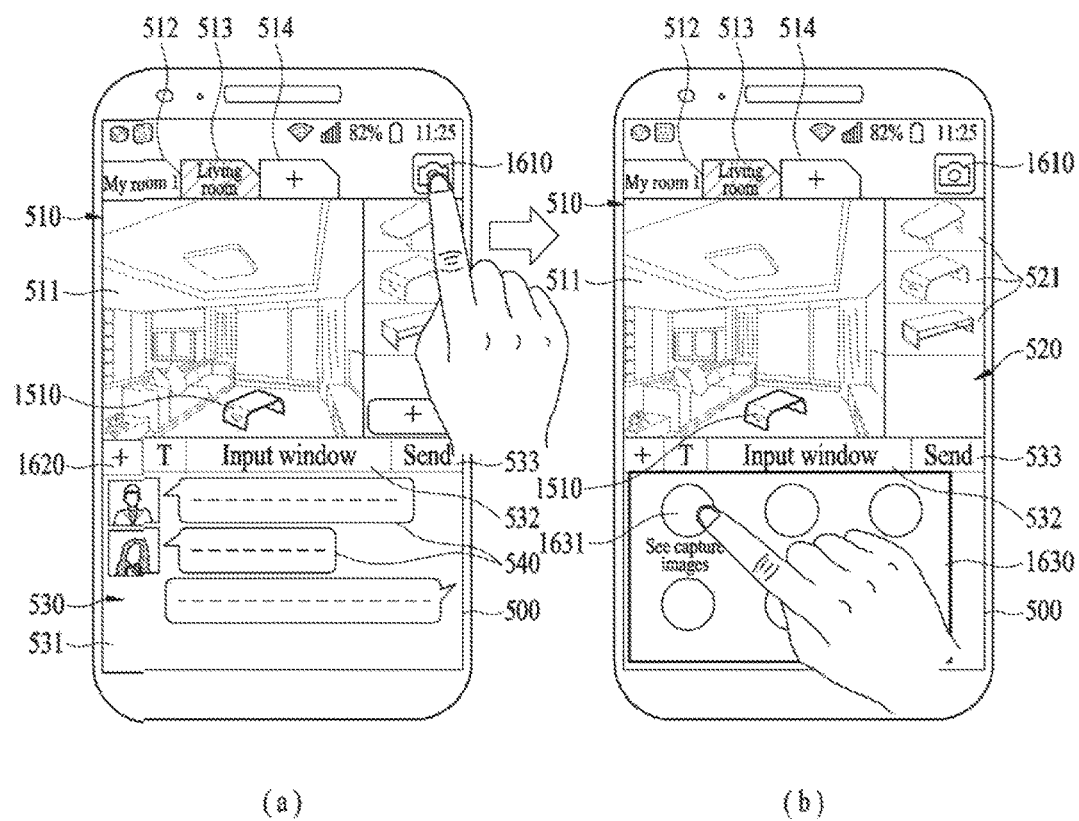
FIG. 16 is a diagram illustrating an example of a method for capturing an image of virtually placed furniture in the mobile terminal according to an embodiment of the present invention.

FIG. 16 is a diagram illustrating an example of a method for capturing an image of virtually placed furniture in the mobile terminal according to an embodiment of the present invention.

The execution screen displayed on the display unit 151 of the mobile terminal 100 may include a menu option 1610 for capturing at least part of the execution screen 500.

Referring to FIG. 16 (a), the user of the mobile terminal 100 may virtually place the first piece of furniture in the first image 511 using the image 1510 of the first piece of furniture, and then select the menu option 1610. When a command for selecting the menu option 1610 is inputted, the controller 180 of the mobile terminal 100 may capture the first image 511 where the image 1510 of the first piece of furniture is placed and then store the captured image in the memory 170.

The execution screen 500 may include a menu option 1620 for selecting additional functions of the specific application.

Referring to FIG. 16 (b), when a command for selecting the menu option 1620 is inputted, the controller 180 of the mobile terminal 100 may display a GUI 1630 including a plurality of menus corresponding to the additional functions of the specific application on the display unit 151.

The GUI 1630 may include a menu 1631 for checking the image captured when the menu option 1610 is selected. By selecting the menu 1631 in the GUI 1630, the user of the mobile terminal 100 can check the image obtained by capturing the first image 511 where the prescribed furniture is virtually arranged. In some embodiments, the controller 180 of the mobile terminal 100 may provide a function of collecting and displaying capture images for each piece of furniture.

Figure 17:
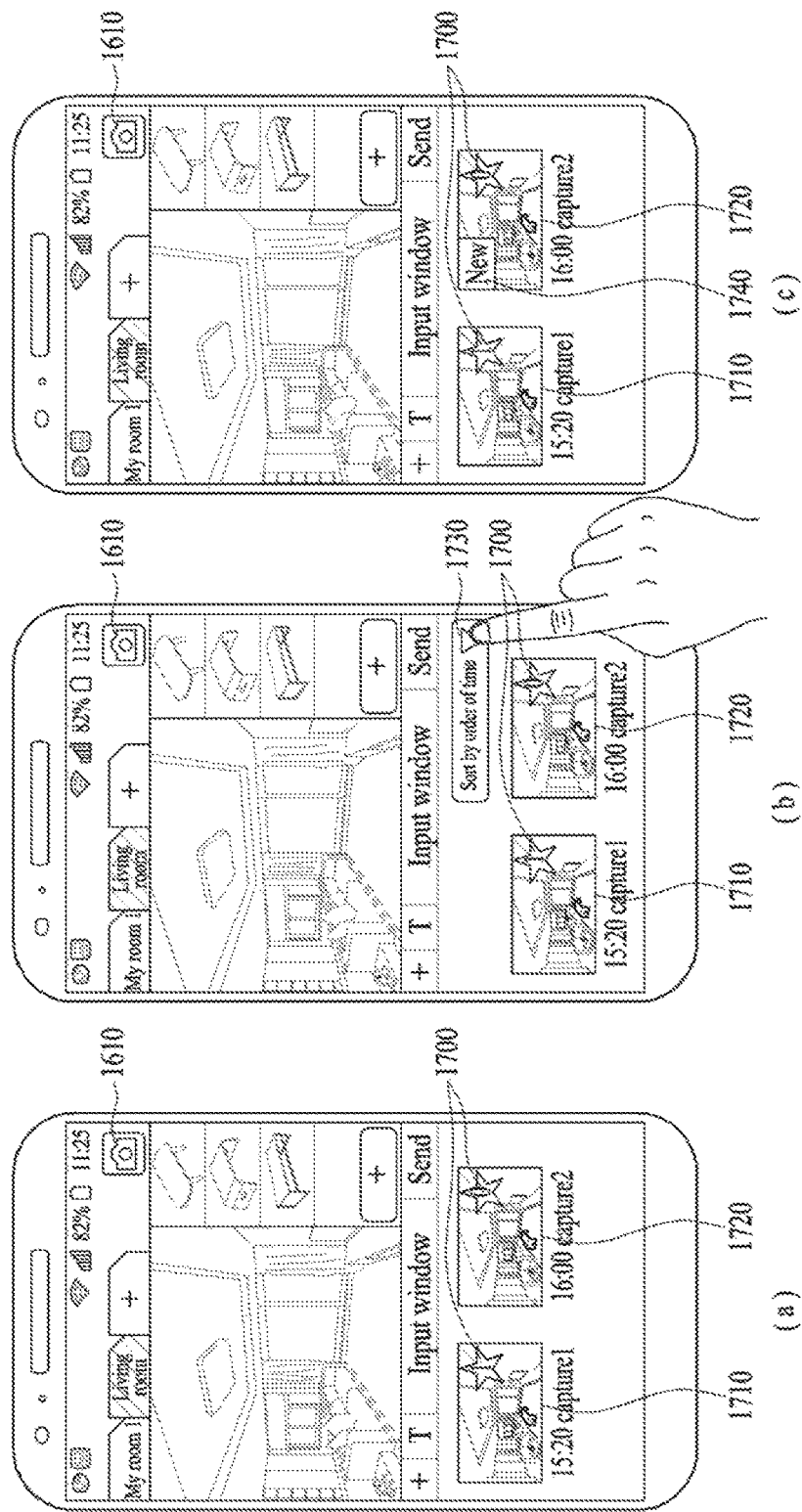
FIG. 17 is a diagram illustrating an example of a method for checking a capture image in the mobile terminal according to an embodiment of the present invention.

FIG. 17 is a diagram illustrating an example of a method for checking a captured image in the mobile terminal according to an embodiment of the present invention.

When a signal for checking capture images of the first image 511 where furniture is virtually arranged is inputted, the controller 180 of the mobile terminal 100 may display the capture images 1710 and 1720 stored in the memory 170 on the execution screen 500. For example, the signal may be a signal for selecting the menu 1631 in the GUI 1630 of FIG. 16. The capture images 1710 and 1720 may be related to the selected first image 511, or in some embodiments, the capture images 1710 and 1720 may include a specific piece of furniture.

Referring to FIG. 17 (a), for example, the capture images 1710 and 1720 may be arranged in order of capture on the execution screen 500, but the invention is not limited thereto. In addition, each of the capture images 1710 and 1720 may include an indicator 1700 indicating preference of the members in the chat room 531. In addition, it can be known that as a number in the indicator 1700 increases, the preference of the members in the chat room 531 also increases.

Meanwhile, referring to FIG. 17 (b), the execution screen 500 may include a menu option 1730 for changing a condition for determining arrangement order of the capture images 1710 and 1720. The user of the mobile terminal 100 may change the arrangement order of the capture images 1710 and 1720 through the menu option 1730 such that the capture images 1710 and 1720 are arranged in order of time, recommendation, etc.

Referring to FIG. 17 (c), the controller 180 of the mobile terminal 100 may display an indicator 1740 for displaying the capture image 1720, which is obtained immediately before display of the execution screen 500, of the capture images 1710 and 1720 on the capture image 1720.

Meanwhile, according to an embodiment of the present invention, if the size of a specific area in the specific space corresponding to the first image, where the user desires to virtually arrange furniture, is greater than that of the furniture, the mobile terminal 100 may display a warning message on the display unit 151 to inform this fact. This will be described with reference to FIG. 18.

Figure 18:
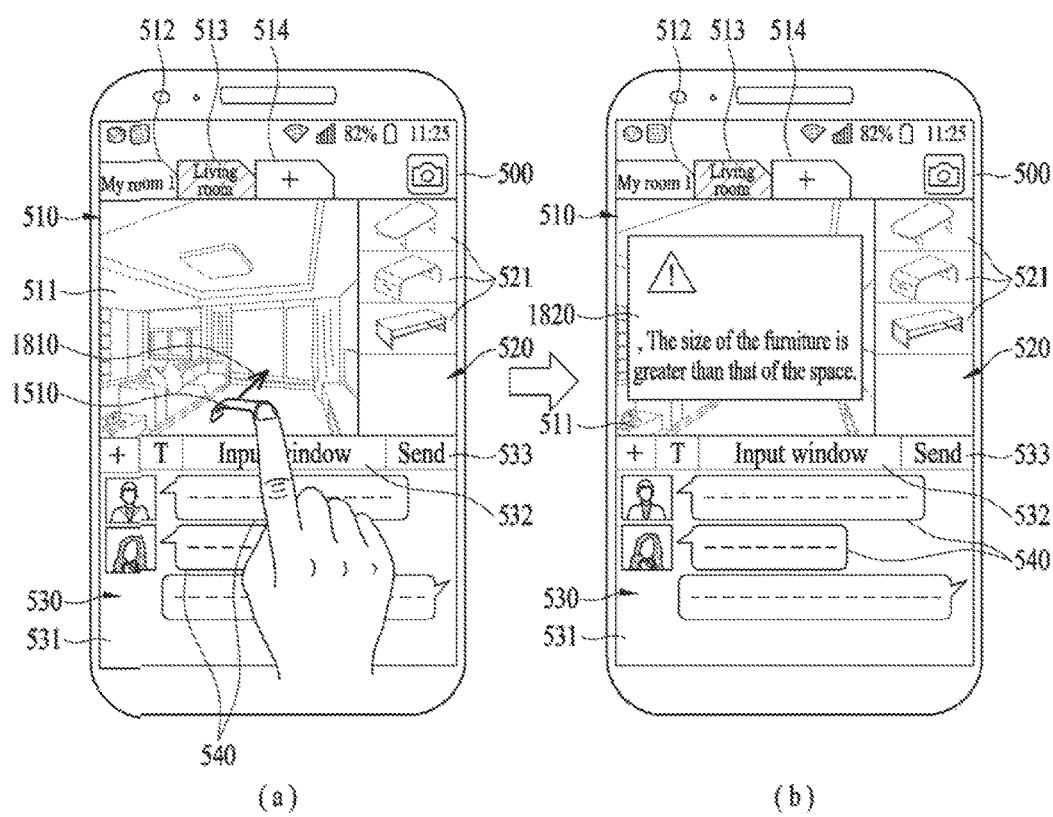
FIG. 18 is a diagram illustrating another example of a method for virtually arranging furniture in the first image of the mobile terminal according to an embodiment of the present invention.

FIG. 18 is a diagram illustrating another example of a method for virtually arranging furniture in the first image of the mobile terminal according to an embodiment of the present invention. The features described above with reference to FIG. 15 will be omitted herein to avoid redundant description.

Referring to FIG. 18 (a), when detecting the first signal for selecting the information of the first piece of furniture from the furniture information 521 displayed in the second area 520, the controller 180 of the mobile terminal 100 may display the image 1510 of the first piece of furniture corresponding to the information 521 on the first piece of furniture on the first image 511. The user of the mobile terminal 100 may change the location of the image 1510 of the first piece of furniture in the first image 511 or rotate the image 1510 of the first piece of furniture in the first image 511. When the image 1510 of the first piece of furniture is a 3D reconstruction image, the user of the mobile terminal 100 may change the rotation angel of the image 1510 of the first piece of furniture in the first image 511.

In the present embodiment, it is assumed that the user of the mobile terminal 100 intends to place the first piece of furniture in a specific area 1810 in the specific space corresponding to the first image 511.

The controller 180 of the mobile terminal 100 may extract the size of the specific area 1810 based on the information on the specific space stored in the memory 170 (e.g., structure of the specific space, information of the furniture previously placed in the specific space, etc.) and then determine whether the first piece of furniture can be placed in the specific area 1810, based on the size and shape of the first piece of furniture.

Referring to FIG. 18 (b), if it is determined, based on the size of the specific area 1810 and the size and shape of the first piece of furniture, that the first piece of furniture cannot be placed in the specific area 1810, the controller 180 of the mobile terminal 100 may display a notification message 1820 on the display unit 151 to inform this fact.

In some embodiments, the controller 180 of the mobile terminal 100 may provide an appropriate location in the first image 511 where the image 1510 of the first piece of furniture is placed, based on the information on the specific space stored in the memory 170 (e.g., structure of the specific space, information of the furniture previously placed in the specific space, etc.) and the information of the first piece of furniture.

In addition, in some embodiments, if an area of the first image 511 where the user desires to virtually place furniture is actually occupied by the furniture previously placed in the specific space, the controller 180 of the mobile terminal 100 may display a notification message on the display unit 151 to inform this fact. In this case, the controller 180 of the mobile terminal 100 may delete an object corresponding the previously placed furniture from the first image 511 according to user's selection.

Although it is assumed in FIG. 18 that the user of the mobile terminal 100, i.e., the master member of the chat room 531 virtually arranges furniture in the first image 511, the present invention can be equally applied to when a non-master member of the chat room 531 virtually arranges furniture in the first image 511.

Meanwhile, according to an embodiment of the present invention, the virtual furniture arrangement can be performed by only the master member of the chat room 531, any member of the chat room 531, or some members authorized by the master member of the chat room 531. This will be described with reference to FIG. 19.

Figure 19:
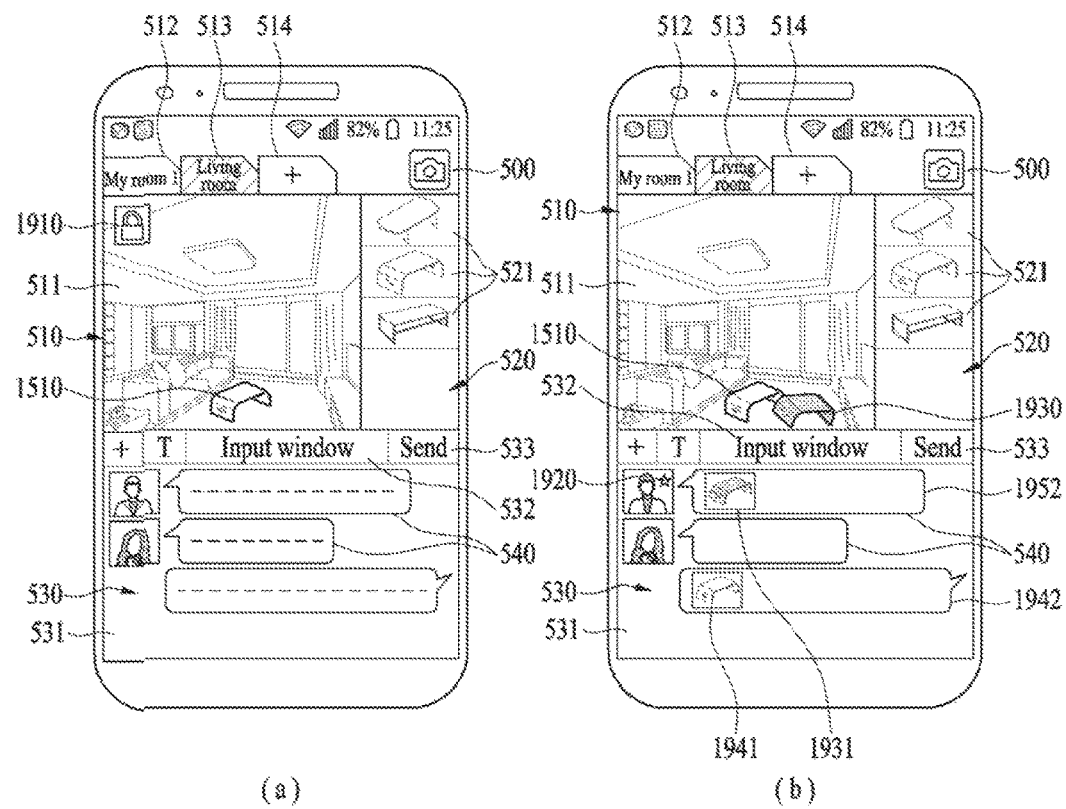
FIG. 19 is a diagram illustrating authority to arrange furniture in the first image of the mobile terminal according to an embodiment of the present invention.

FIG. 19 is a diagram illustrating authority to arrange furniture in the first image of the mobile terminal according to an embodiment of the present invention. The features described above with reference to FIG. 15 will be omitted herein to avoid redundant description.

Referring to FIG. 19 (a), the user of the mobile terminal 100 corresponding to the master member of the chat room 531 can virtually arrange the first piece of furniture in the first image 511 using the image 1510 of the first piece of furniture. The user of the mobile terminal 100 may not allow the non-master members in the chat room 531 to perform the virtual furniture arrangement. For example, the user of the mobile terminal 100 may give the non-master members authority to perform the virtual furniture arrangement through a configuration menu related to the chat room 531 or not. In the embodiment shown in FIG. 19 (a), the latter case is assumed. In this embodiment, the non-master members in the chat room 531 can share the virtual furniture arrangement situation and exchange their opinions but cannot virtually arrange or change furniture in the first image 511. In some embodiments, the controller 180 of the mobile terminal 100 may display, on the execution screen 500, an indicator 1910 indicating that the non-master members are not allowed to perform the virtual furniture arrangement.

Meanwhile, referring to FIG. 19 (b), the user of the mobile terminal 100 can give the non-master members the authority to perform the virtual furniture arrangement through the configuration menu related to the chat room 531. In this case, the user of the mobile terminal 100 may give all the non-master members the authority to perform the virtual furniture arrangement. Alternatively, the user of the mobile terminal 100 may give specific non-master members the authority to perform the virtual furniture arrangement. In the latter case, the controller 180 of the mobile terminal 100 may display an indicator 1920 indicating that among the members in the chat room 531, a certain member is given the authority to perform the virtual furniture arrangement in an area (or nearby place) in which information on each member in the chat room 531 is displayed. For convenience of description, the non-master member given the authority to perform the virtual furniture arrangement is referred to as a specific member.

The controller 180 of the mobile terminal 100 may control the wireless communication unit 110 to receive at least one of a third signal for changing the location of the image 1510 of the first piece of furniture in the first image 511 and a fourth signal for rotating the image 1510 of the first piece of furniture in the first image 511 from a device of the specific member. In addition, the controller 180 of the mobile terminal 100 may change at least one of the location, size, and rotation angle of the image 1510 of the first piece of furniture in the first image 511, based on at least one of the third and fourth signals. That is, the first piece of furniture in the first image 511 can be virtually arranged (or changed) as intended by the specific member.

In some embodiments, the controller 180 of the mobile terminal 100 may visually distinguish between the virtual arrangement of the first piece of furniture made by the user of the mobile terminal 100 corresponding to the master member and the virtual arrangement of the first piece of furniture made by the non-master member given the authority to perform the virtual furniture arrangement.

Specifically, the controller 180 of the mobile terminal 100 may display, on the first image 511, both of the image 1510 of the first piece of furniture placed in the first image 511 based on at least one of the first and second signals, which is described above with reference to FIG. 15, and the image 1510 (hereinafter, a drawing number of 1930 is used to distinguish the two images) of the first piece of furniture placed in the first image 511 based on at least one of the third and fourth signals. However, they can be visually distinguished from each other. For example, at least one of a color, a transparent level, and a pattern of the image 1510 of the first piece of furniture based on at least one of the first and second signals may be different from that of the image 1930 of the first piece of furniture based on at least one of the third and fourth signals.

In some embodiments, the image 1510 of the first piece of furniture and the image 1930 of the first piece of furniture may be displayed together on the first image 511 in an overlaid manner. If the image 1510 of the first piece of furniture is displayed in a specific area of the first image 511, the image 1930 of the first piece of furniture cannot be placed in the overlaid area where the image 1510 of the first piece of furniture overlaps with the image 1930 of the first piece of furniture. That is, in the overlaid area of the specific space, the virtual arrangement of the first piece of furniture made by two or more members may not be allowed.

In addition, in some embodiments, the controller 180 of the mobile terminal 100 may display which member makes images of furniture displayed in the first image 511 for the virtual furniture arrangement. For example, the controller 180 of the mobile terminal 100 may display information 1940 indicating that the image 1510 of the first piece of furniture is a result of the virtual arrangement made by the master member among the members in the chat room 531 on a chat window 1924 corresponding to the master member, and display information 1951 indicating that the image 1510 of the first piece of furniture is a result of the virtual arrangement made by the specific member on a chat window 1952 corresponding to the specific member.

Figure 20:
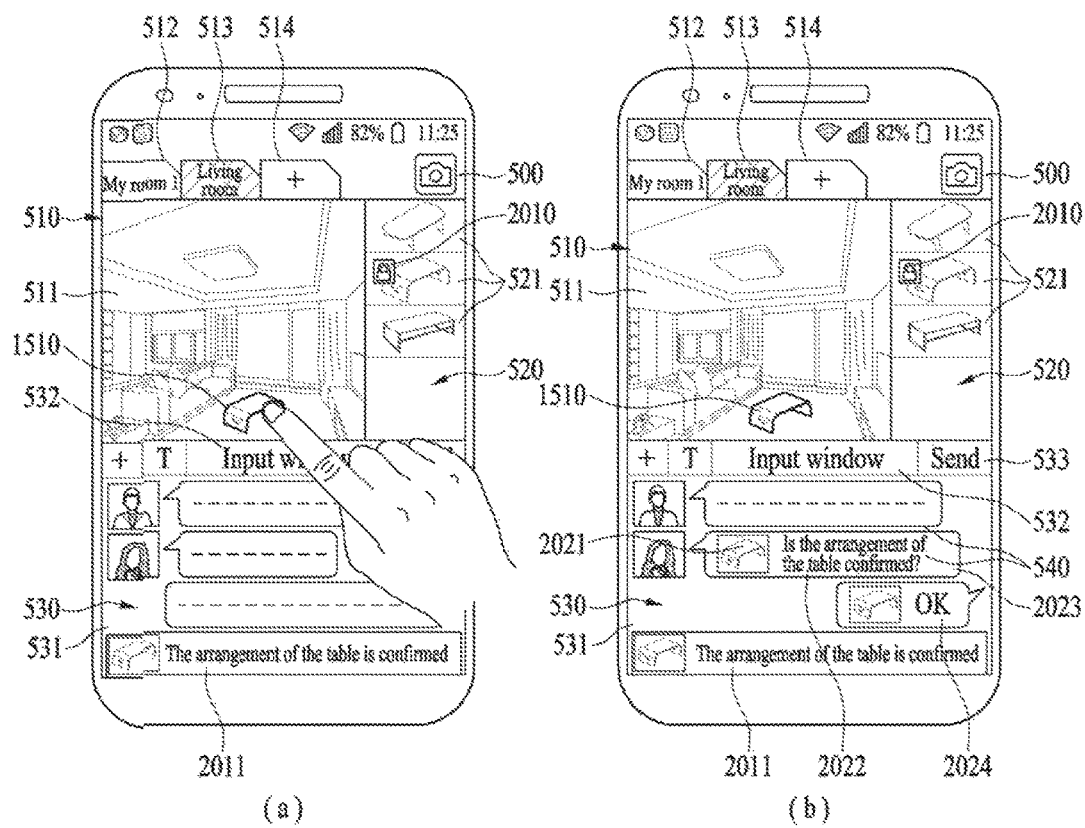
FIG. 20 is a diagram illustrating an example of a method for confirming virtual arrangement of a specific piece of furniture in the first image of the mobile terminal according to an embodiment of the present invention.

FIG. 20 is a diagram illustrating an example of a method for confirming virtual arrangement of a specific piece of furniture in the first image of the mobile terminal according to an embodiment of the present invention. The features described above will be omitted herein to avoid redundant description.

The controller 180 of the mobile terminal 100 may display, on the first image 511, the image 1510 of the first piece of furniture corresponding to the information 521 on the first piece of furniture.

When detecting a signal for confirming the arrangement of the first piece of furniture in the first image 511, the controller 180 of the mobile terminal 100 may configure lock so that the location, size, and rotation angle of the image 1510 of the first piece of furniture cannot be changed. In some embodiments, when detecting such a signal, the controller 180 of the mobile terminal 100 may not allow to change the color of the image 1510 of the first piece of furniture. Here, the confirmation of the furniture arrangement may mean that at least one of the location, rotation angle, and color of the furniture is fixed so that changes are not allowed any more.

For example, referring to FIG. 20 (a), the controller 180 of the mobile terminal 100 may detect a first predetermined signal. The first signal may be a touch signal of touching the image 1510 of the first piece of furniture during a predetermined time or more, or a touch signal of touching a menu option for confirming virtual arrangement of a specific piece of furniture, which is displayed on the execution screen 500. In addition, the controller 180 of the mobile terminal 100 may also display an indicator 2010 indicating that lock is set up regarding the arrangement of the first piece of furniture, on the information 521 on the first piece of furniture displayed in the second area 520. Moreover, the controller 180 of the mobile terminal 100 may display a notification message 2011 indicating that the arrangement of the first piece of furniture is confirmed in the chat room 531.

As another example, referring to FIG. 20 (b), the controller 180 of the mobile terminal 100 may recognize at least one of first information of the first piece of furniture (e.g., an indicator 2021 indicating the first piece of furniture and a text 2022 corresponding to the name of the first piece of furniture), second information on confirmation of the virtual furniture arrangement (e.g., a text 2023 corresponding to 'arrangement confirmation'), third information on agreement of the virtual furniture arrangement (e.g., a text 2024) from information displayed in the chat room 531 (e.g., image, graphic, text, etc.) and then confirm the arrangement of the image 1510 of the first piece of furniture in the first image 511 based on the recognized information. In addition, the controller 180 of the mobile terminal 100 may also display the indicator 2010 indicating that lock is set up regarding the arrangement of the first piece of furniture, on the information 521 on the first piece of furniture displayed in the second area 520. Moreover, the controller 180 of the mobile terminal 100 may display the notification message 2011 indicating that the arrangement of the first piece of furniture is confirmed in the chat room 531.

In some embodiments, it is a matter of course that the confirmed arrangement of the first piece of furniture can be released.

In the present embodiment, it is assumed that when the arrangement of the specific piece of furniture in the first image 511 is confirmed, the notification message 2011 indicating the confirmation is displayed in the chat room 531. However, in some embodiments, when the location, color, rotation angle, and the like of an image of a specific piece of furniture in the first image 511 is changed, when an image of a new specific piece of furniture is displayed on the first image 511, or when an object corresponding to the furniture previously placed in the specific pace corresponding to the first image 511 is changed, a notification message information the change may be displayed in the chat room 531.

Meanwhile, according to an embodiment of the present invention, the mobile terminal 100 may inform the user of a candidate area in the specific space corresponding to the first image 511, where the first piece of furniture can be arranged. This will be described with reference to FIG. 21.

Figure 21:
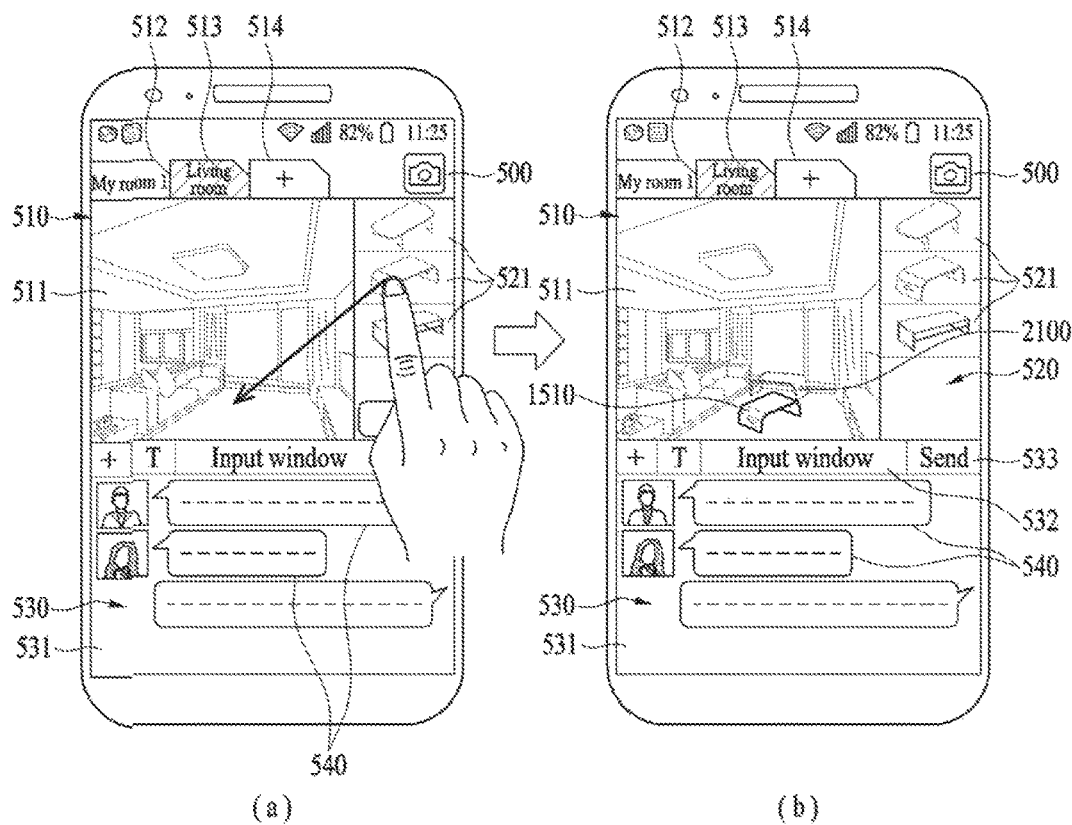
FIG. 21 is a diagram illustrating a further example of a method for virtually arranging furniture in the first image of the mobile terminal according to an embodiment of the present invention.

FIG. 21 is a diagram illustrating a further example of a method for virtually arranging furniture in the first image of the mobile terminal according to an embodiment of the present invention. The features described above will be omitted herein to avoid redundant description.

Referring to FIG. 21 (a), the controller 180 of the mobile terminal 100 detects a first signal for selecting the information of the first piece of furniture from the furniture information 521 displayed in the second area 520. For example, the first signal may correspond to a signal of touching information of a specific piece of furniture from the furniture information 521 displayed in the second area 520 and dragging it into the first area 510.

Referring to FIG. 21 (b), when detecting the first signal, the controller 180 of the mobile terminal 100 may display the image 1510 of the first piece of furniture corresponding to the information 521 on the first piece of furniture on the first image 511. In this case, based on the information on the specific space corresponding to the first image 511 and the information of the first piece of furniture, which is stored in the memory 170, the controller 180 of the mobile terminal 100 may display an indicator 2100 indicating a candidate area in the specific space where the first piece of furniture can be arranged in the first image 511.

In addition, in some embodiments, when the controller 180 of the mobile terminal 100 already has information on a wiring structure of the specific space corresponding to the first image 511, the controller 180 of the mobile terminal 100 may select the candidate area in the specific space where the first piece of furniture can be arranged, based on the information on the specific space corresponding to the first image 511 and the information of the first piece of furniture.

Moreover, in some embodiments, the controller 180 of the mobile terminal 100 may transmit the information on the specific space and the information of the first piece of furniture to a predetermined expert (i.e., an external device belonging to the expert). Thereafter, based on the guide related to arrangement transmitted from the external device belonging to the expert, the controller 180 of the mobile terminal 100 may select the candidate area in the specific space where the first piece of furniture can be arranged.

Figure 22:
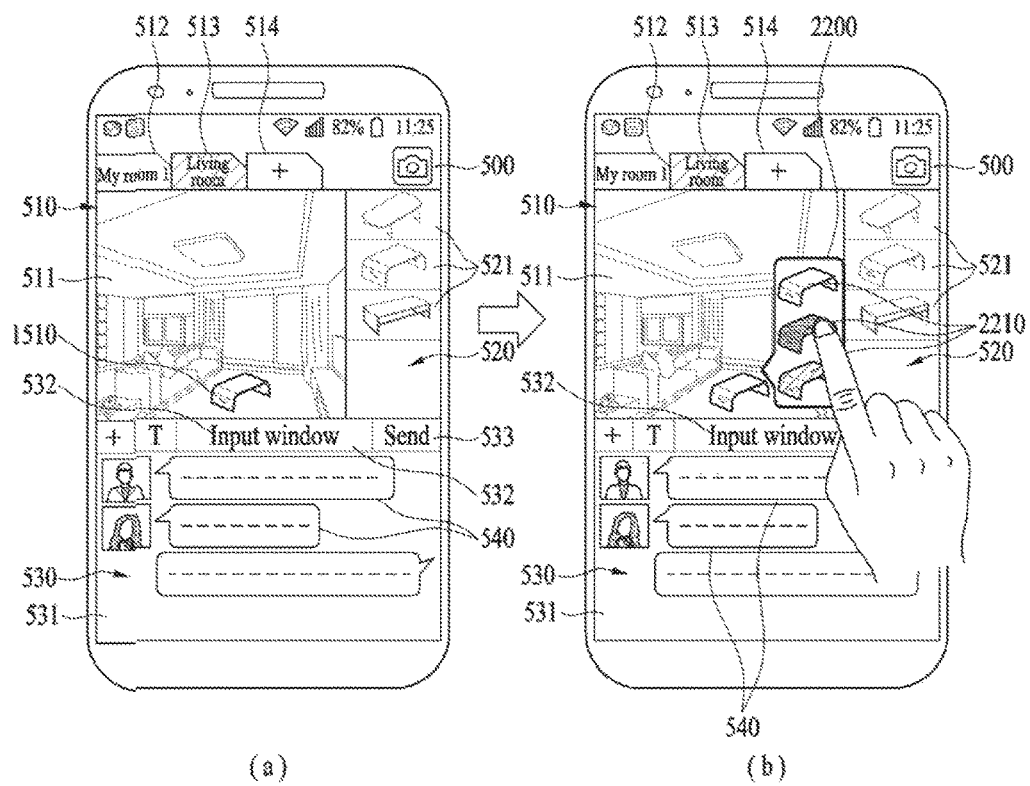
FIG. 22 is a diagram illustrating an example of a method for changing color of furniture virtually placed in the first image of the mobile terminal according to an embodiment of the present invention.

FIG. 22 is a diagram illustrating an example of a method for changing color of furniture virtually placed in the first image of the mobile terminal according to an embodiment of the present invention. The features described above will be omitted herein to avoid redundant description.

Referring to FIG. 22 (*a*), the controller 180 of the mobile terminal 100 may display the image 1510 of the first piece of furniture corresponding to the information 521 on the first piece of furniture on the first image 511.

When detecting a signal for changing the color of the image 1510 of the first piece of furniture displayed on the first image 511, the controller 180 of the mobile terminal 100 may change the color of the image 1510 of the first piece of furniture.

For example, referring to FIG. 22 (*b*), the controller 180 of the mobile terminal 100 may detect a first predetermined signal. The first signal may be a touch signal of touching the image 1510 of the first piece of furniture during a predetermined time or more, or a touch signal of touching a menu option for changing the color of a specific piece of furniture displayed on the execution screen 500. When detecting the first signal, the controller 180 of the mobile terminal 100 may display a GUI 2200 including different colors of images 2210 relating to the first piece of furniture on the execution screen 500. In some embodiments, the GUI 2200 may include menu options corresponding to different colors instead of the images 2210 relating to the first piece of furniture.

The user of the mobile terminal 100 may select a desired color through the GUI 2200. When a specific color is selected through the GUI 2200, the controller 180 of the mobile terminal 100 may change the color of the image 1510 of the first piece of furniture to the specific color.

Figure 23:
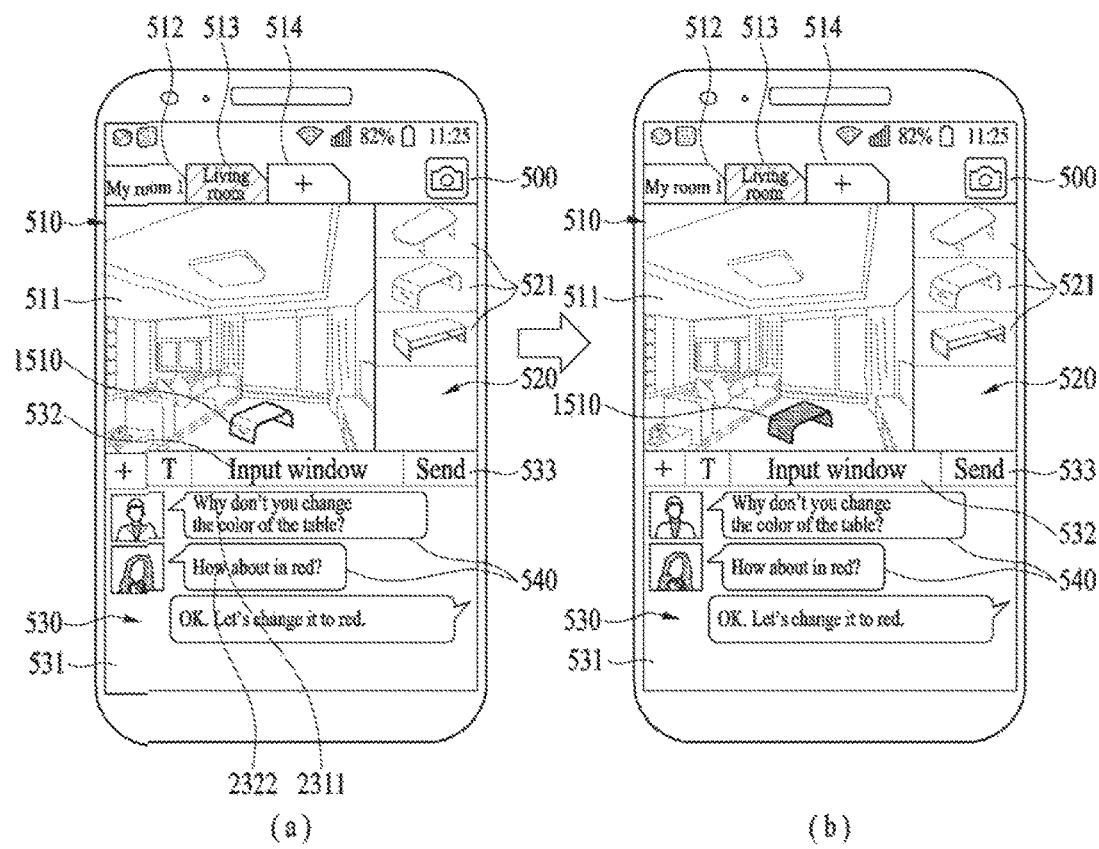
FIG. 23 is a diagram illustrating another example of a method for changing color of furniture virtually placed in the first image of the mobile terminal according to an embodiment of the present invention.

FIG. 23 is a diagram illustrating another example of a method for changing color of furniture virtually placed in the first image of the mobile terminal according to an embodiment of the present invention. The features described above will be omitted herein to avoid redundant description.

Referring to FIG. 23 (*a*), the controller 180 of the mobile terminal 100 may display the image 1510 of the first piece of furniture corresponding to the information 521 on the first piece of furniture on the first image 511.

When detecting a signal for changing the color of the image 1510 of the first piece of furniture displayed on the first image 511, the controller 180 of the mobile terminal 100 may change the color of the image 1510 of the first piece of furniture.

For example, the controller 180 of the mobile terminal 100 may recognize first information of the first piece of furniture (e.g., a text 2311) and second information on a specific color (e.g., a text 2322) from information displayed in the chat room 531 (e.g., image, graphic, text, etc.) and then change the color of the image 1510 of the first piece of furniture to the color indicated by the recognized second information as shown in FIG. 23 (*b*).

According to the present invention, it has an advantage in that the color of the image 1510 of the first piece of furniture can be automatically changed as intended by the members in the chat room 531 even through the members in the chat room 531 do not directly change the color of the image 1510 of the first piece of furniture.

Meanwhile, according to an embodiment of the present invention, when the user of the mobile terminal 100 virtually arrange furniture in the first image 511, the user of the mobile terminal 100 can delete the furniture previously placed in the specific space corresponding to the first image 511 or change the location of the previously placed furniture within the first image 511. This will be described with reference to FIG. 24.

Figure 24:
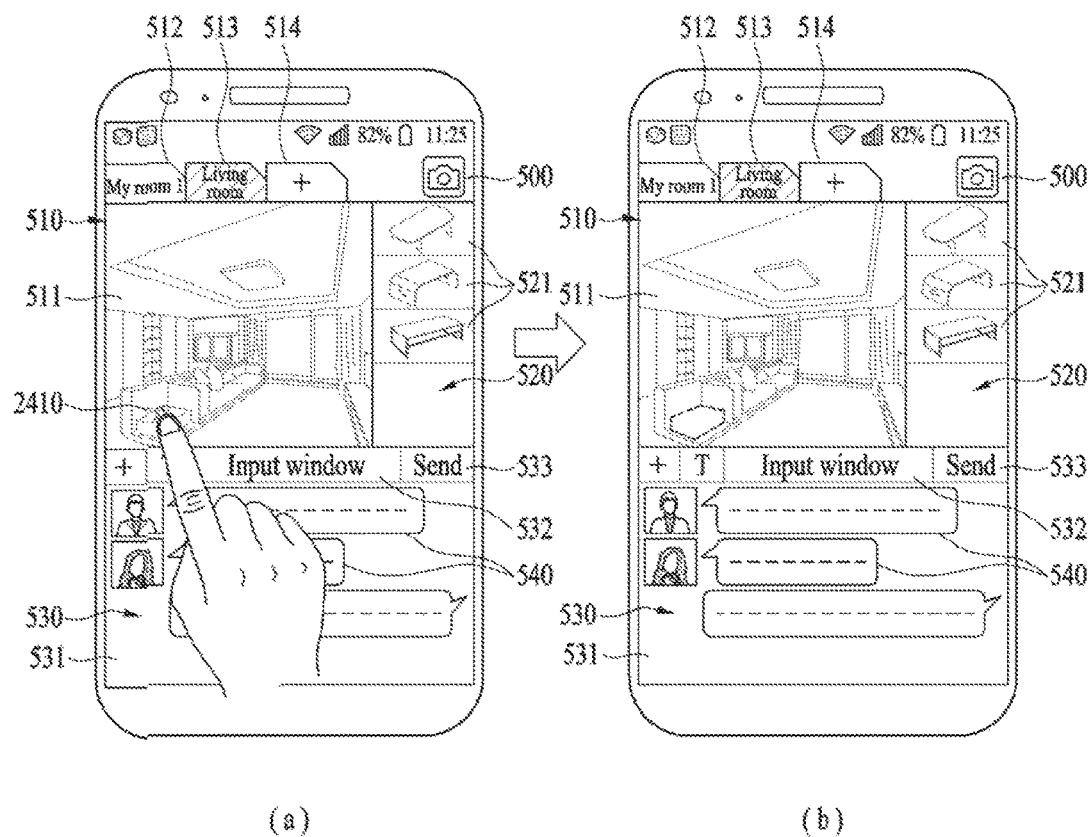
FIG. 24 is a diagram illustrating an example of a method for eliminating or changing furniture previously placed in a specific space corresponding to the first image in the mobile terminal according to an embodiment of the present invention.

FIG. 24 is a diagram illustrating an example of a method for eliminating or changing furniture previously placed in a specific space corresponding to the first image in the mobile terminal according to an embodiment of the present invention. The features described above will be omitted herein to avoid redundant description.

Referring to FIG. 24 (*a*), the controller 180 of the mobile terminal 100 may obtain the information on the specific space corresponding to the first image 511 from the first image 511 or from the first image 511 and information tagged with the first image 511 (e.g., above-described distance information). In addition, the controller 180 of the mobile terminal 100 may extract objects included in the first image 511 through the obtained information on the specific space and edge detection/color detection of the first image 511. The object included in the first image 511 may be the furniture previously placed in the specific space.

When the user of the mobile terminal 100 virtually arranges furniture in the first image 511, the user may delete, from the first image 511, the furniture previously placed in the specific space corresponding to the first image 511 or change, in the first image 511, the location of the furniture previously placed in the specific space corresponding to the first image 511.

The controller 180 of the mobile terminal 100 detects a first signal for selecting an object 2410 corresponding to a specific piece of furniture in the first image 511, which is previously placed in the specific space. For example, the first signal may correspond to a touch signal of touching the object 2410 during a predetermined time or more and dragging it out of the first image 511.

Referring to FIG. 24 (*b*), the controller 180 of the mobile terminal 100 may eliminate the object 2410 from the first image 511. In this case, based on margins of the objects 2410 in the first image 511, the controller 180 of the mobile terminal 100 may fill up the space where the object 2410 was placed in the first image 511.

Meanwhile, although not shown in the drawings, the user of the mobile terminal 100 may select an object corresponding to the furniture previously placed in the specific space and drag the object to a random point on the first image 511 in order to change the location of the selected object.

Figure 25:
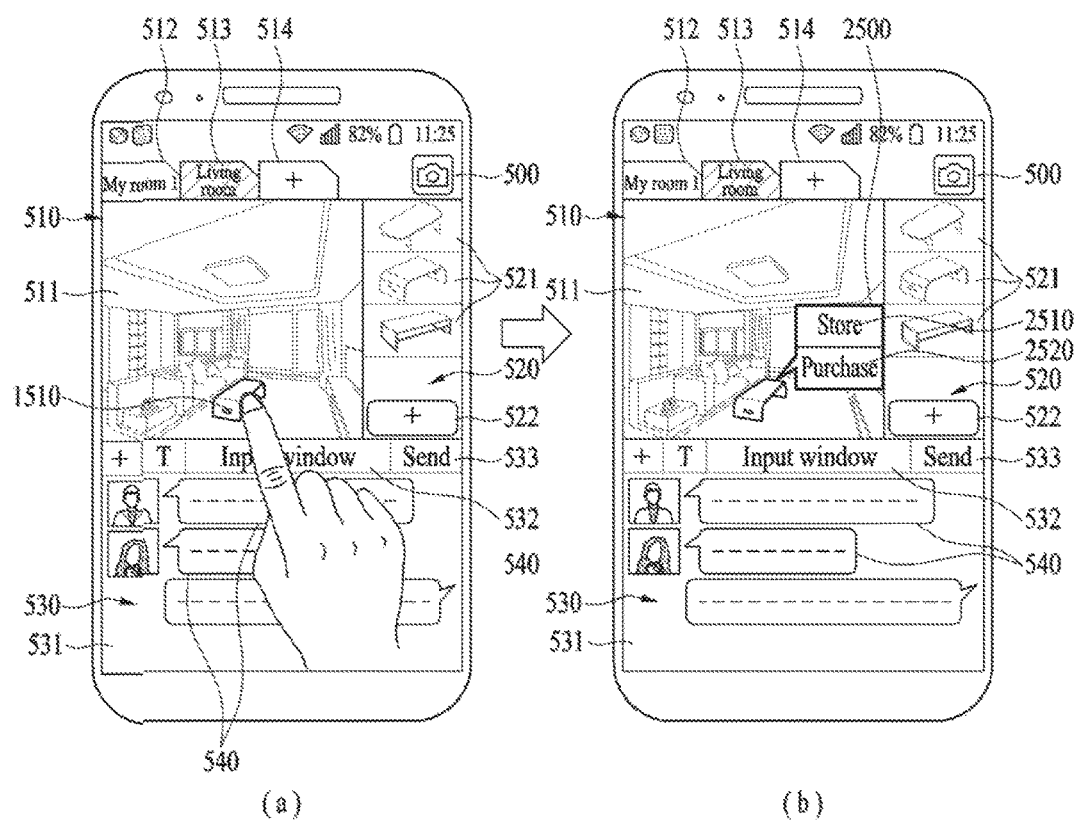
FIG. 25 is a diagram illustrating examples of a situation that can occur after virtual arrangement of a specific piece of furniture in the first image of the mobile terminal according to an embodiment of the present invention.

FIG. 25 is a diagram illustrating examples of a situation that can occur after virtual arrangement of a specific piece of furniture in the first image of the mobile terminal according to an embodiment of the present invention. The features described above will be omitted herein to avoid redundant description.

Referring to FIG. 25 (*a*), the user of the mobile terminal 100 may input a predetermined command after completing the virtual arrangement of the first piece of furniture in the first image 511. For example, the predetermined command may be a touch command inputted by touching the image 1510 of the first piece of furniture during a predetermined time or more, or a touch command inputted by touching a menu option for completing the arrangement of a specific piece of furniture, which is displayed on the execution screen 500.

Referring to FIG. 25 (b), when the predetermined command is inputted, the controller 180 of the mobile terminal 100 may display a GUI 2500 on the display unit 151. For example, the GUI 2500 may include a first menu 2510 for storing the information of the first piece of furniture (e.g., ID of the first piece of furniture, features of the first piece of furniture, manufacturing company of the first piece of furniture, stock of the first piece of furniture, size of the first piece of furniture, etc.), of which the arrangement is completed, and information related to the arrangement of the image 1510 of first piece of furniture in the first image 511 (including the capture image obtained by capturing the first image 511 where the first piece of furniture is virtually arranged), and a second menu 2520 for purchasing the first piece of furniture.

The storage in accordance with the first menu 2510 may mean that the information of the first piece of furniture is temporality stored in a storage box. Here, the storage box may be the memory 170 of the mobile terminal 100 or a storage facility of the server that provides the specific application. In addition, when the specific application can be interconnected to a furniture shopping mall application managed by a specific furniture company or shopping mall company, the storage box may mean a storage facility of the server that provides the furniture shopping mall application.

Meanwhile, the user of the mobile terminal 100 may directly purchase the first piece of furniture through the second menu 2520. In the present embodiment, the specific application may provide a furniture purchase service or be interconnected to the furniture shopping mall application managed by the specific furniture company or shopping mall company. When a command for selecting the second menu 2520 is inputted, the controller 180 of the mobile terminal 100 may display a purchase page for purchasing the first piece of furniture. In addition, the controller 180 of the mobile terminal 100 can control the wireless communication unit 110 to transmit the information related to the arrangement of the image 1510 of first piece of furniture in the first image 511 (e.g., the first image 511 where the first piece of furniture is virtually arranged) to an external server (e.g., the server that provides the specific application or server that provides the furniture shopping mall application). Moreover, when the first piece of furniture is shipped, a company in charge of shipping the first piece of furniture may use the information related to the arrangement of the image 1510 of first piece of furniture in placing the first piece of furniture. Further, in some embodiments, the specific application or furniture shopping mall application may provide a notification message to the members in the chat room 531 on a shipping date of the first piece of furniture.

Meanwhile, according to an embodiment of the present invention, the user of the mobile terminal 100 may watch the first image 511 where furniture is virtually arranged using an HMD device. This will be described with reference to FIG. 26.

Figure 26:
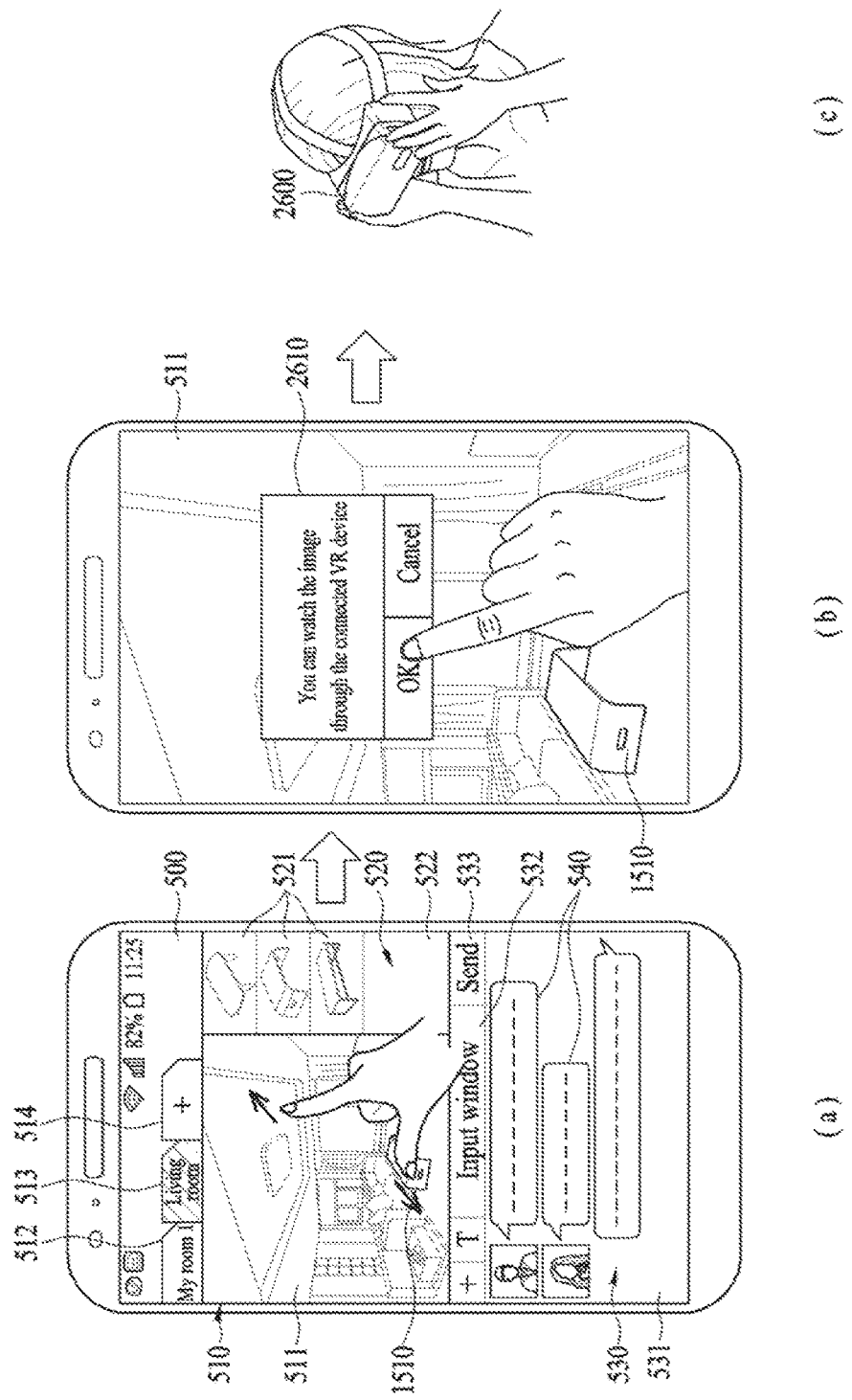
FIG. 26 is a diagram illustrating an example of a method for watching the first image where furniture is virtually arranged using an HMD device connected the mobile terminal according to an embodiment of the present invention.

FIG. 26 is a diagram illustrating an example of a method for watching the first image 511 where furniture is virtually arranged using an HMD device connected the mobile terminal according to an embodiment of the present invention.

Referring to FIG. 26 (a), the controller 180 of the mobile terminal 100 may detect a first predetermined signal. As an input signal for watching the first image 511, where furniture is virtually arranged, using an HMD device (e.g., virtual reality (VR) device), the first predetermined signal may be, for example, a touch signal of touching two random points on the first image 511 and dragging the two points in opposite directions such that the two points are far away.

Referring to FIG. 26 (b), the controller 180 of the mobile terminal 100 may enlarge the first image 511 where the furniture is virtually arranged such that its size becomes larger, and then display the enlarged first image 511 on the display unit 151. In addition, the controller 180 may display, on the display unit 151, a notification message 2610 for informing that the user can watch the first image 511 using a VR device after connecting the mobile terminal 100 to the VR device.

If a confirm menu in the notification message is selected, the controller 180 of the mobile terminal 100 may convert the first image 511 into an image for the left eye and an image for the right eye, divide the display unit 151 into a display area for the left eye and a display area for the right eye, display the converted image for the left eye in the display area for the left eye, and then display the converted image for the right eye in the display area for the right eye.

Referring to FIG. 26 (c), the user of the mobile terminal 100 may connect the mobile terminal 100 to a VR device 2600 and then wear the VR device 2600 on the head. By doing so, the user of the mobile terminal 100 may experience virtual reality as the user directly places furniture in the corresponding space, by watching the converted first image displayed through the display unit 151.

Figure 27:
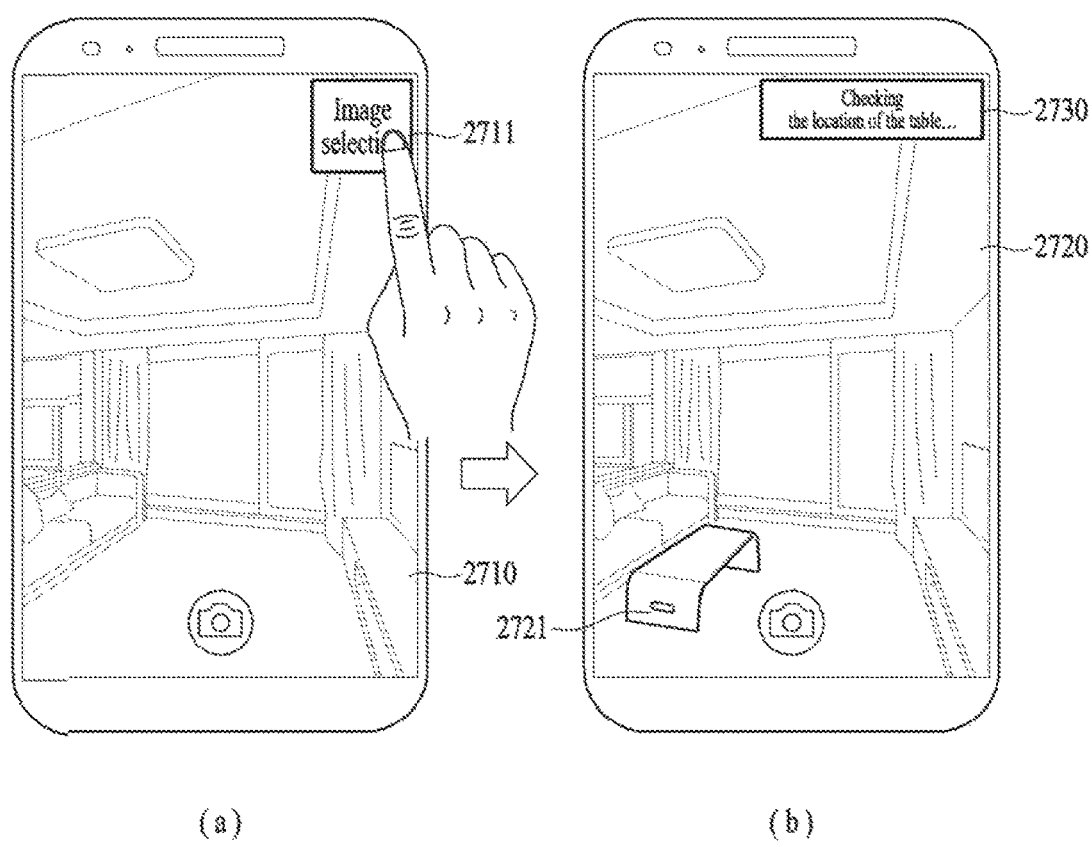
FIG. 27 is a diagram illustrating an example of a method for utilizing an image containing the above-described virtual arrangement results at the mobile terminal according to an embodiment of the present invention in actually arranging the first piece of furniture.

FIG. 27 is a diagram illustrating an example of a method for utilizing an image containing the above-described virtual arrangement results at the mobile terminal according to an embodiment of the present invention in actually arranging the first piece of furniture.

According to the present invention, a member in the chat room 531 or an employee of the furniture shipping company can use as references the capture image obtained by capturing the first image 511 where the virtual arrangement of the first piece of furniture is completed when actually arranging the first piece of furniture.

Referring to FIG. 27 (a), the user of the mobile terminal 100 (the member in the chat room 531 or employee of the furniture shipping company) can activate the camera 121, and the controller 180 can display a preview image 2710 obtained by the camera 121 on the display unit 151. In addition, the display unit 151 of the mobile terminal 100 can display a menu option 2711 for checking and selecting images captured and stored for the virtual furniture arrangement When the menu option 2711 is selected, the controller 180 of the mobile terminal 100 can display the images captured and stored for the virtual furniture arrangement on the display unit 151. The user of the mobile terminal 100 may select the image obtained by capturing the first image 511 where the virtual arrangement of the first piece of furniture is completed from among the displayed images.

Referring to FIG. 27 (b), the controller 180 of the mobile terminal 100 can display the selected capture image 2820 on the preview image 2710. That is, the capture image 2820 is displayed by overlapping the preview image 2710, and in this case, transparency of the capture image 2820 may be set to be higher than that of the preview image 2710. By doing so, it is possible to achieve the visual effect that the preview image 2710 is transparently seen through the capture image 2820.

The user of the mobile terminal 100 may adjust the mobile terminal 100 such that the position of an object in the capture image 2820 matches that of an object in the preview image 2710, which corresponds to the object in the capture image 2820. Thus, by checking an image 2821 of the first piece of furniture on the capture image 2820, the user of the mobile terminal 100 can be aware of a location where the first piece of furniture will be placed in the specific space. The controller 180 of the mobile terminal 100 may display on the display unit 151 a notification message 2730 informing that the location where the first piece of furniture will be placed is currently displayed.

According to the above-described embodiments of the present invention, it is possible to provide solution for allowing a user to virtually arrange furniture on an image corresponding to a specific space and exchange opinions about the furniture arrangement with many people. In addition, according to the aforementioned embodiments of the present invention, it is also possible to provide user experience and environment optimized for virtual furniture arrangement.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

The present invention relates to a mobile terminal, and the invention has industrial applicability.

What is claimed is:

1. A mobile terminal, comprising:
a wireless communication unit configured to communicate with an external server or device;
a display unit configured to display an execution screen of a specific application; and
a controller,
wherein the executions screen comprises at least a first area for displaying a first image corresponding to a specific space, a second area for displaying information of each of a plurality of pieces of furniture that can be virtually arranged in the first image, and a third area including a chat room for exchanging opinions about virtual furniture arrangement in the first image with at least one user using a predetermined external device where the specific application is installed,
wherein the controller is configured to recognize a predetermined first text from texts displayed in the chat room, and
wherein when the recognized first text matches information of a second piece of furniture displayed in the second area, the controller is further configured to display at least part of the information of the second piece of furniture in the chat room of the third area.

2. The mobile terminal of claim 1, wherein the chat room in the third area comprises a chat window for text input, and wherein when a text is inputted to the chat window after detection of a first signal that selects information of a first piece of furniture from the information of the plurality of pieces of furniture displayed in the second area, the controller is configured to display first information corresponding to the inputted text and second information corresponding to at least part of the selected information of the first piece of furniture in the chat room of the third area.

3. The mobile terminal of claim 1, wherein the first image comprises at least one of an image stored in a memory of the mobile terminal, a preview image obtained by a camera of the mobile terminal, and an image received from the external server or device through the wireless communication unit.

4. The mobile terminal of claim 1, wherein the first image comprises at least one of a 2-dimensional (2D) image, a 3-dimensional (3D) image, and a 3D reconstruction image.

5. The mobile terminal of claim 1, wherein when detecting a second signal that selects information of a third piece of furniture from the information of the plurality of pieces of furniture displayed in the second area and drags the selected information into the first area, the controller is configured to display an image of the third piece of furniture, and wherein the image of the third piece of furniture is a 3-dimensional (3D) reconstruction image.

6. The mobile terminal of claim 5, wherein when detecting at least one of a third signal for changing a location of the image of the third piece of furniture in the first image and a fourth signal for rotating the image of the third piece of furniture in the first image, the controller is configured to change at least one of the location of the image of the third piece of furniture, a size of the image of the third piece of furniture, and a rotation angle of the image of the third piece of furniture in the first image.

7. The mobile terminal of claim 6, wherein the controller is configured to control the wireless communication unit to transmit information of the first image and information of the image of the third piece of furniture, which is displayed on the first image, to the predetermined external device.

8. The mobile terminal of claim 6, further comprising a memory configured to store at least one of size information of the specific space corresponding to the first image, location information of furniture previously placed in the specific space, shape information of the furniture previously placed in the specific space, and size information of the furniture previously placed in the specific space, and at least one of shape information of the third piece of furniture, color information of the third piece of furniture, and size information of the third piece of furniture.

9. The mobile terminal of claim 8, wherein when detecting the at least one of the third and fourth signals, the controller is configured to change the at least one of the location of the image of the third piece of furniture, the size of the image of the third piece of furniture, and the rotation angle of the image of the third piece of furniture in the first image based on the information stored in the memory.

10. The mobile terminal of claim 8, wherein when the size of the image of the third piece of furniture determined according to the at least one of the third and fourth signals is larger than that of a specific area in the first image, the controller is configured to display a notification message on the display unit.

11. The mobile terminal of claim 8, wherein the controller is configured to display, on the first image, an indicator for notifying a candidate area where the third piece of furniture can be placed in the specific place, based on the information stored in the memory.

12. The mobile terminal of claim 8, when detecting an eighth signal for selecting an object in the first image corresponding to a specific piece of furniture among a plurality of pieces of furniture previously placed in the specific space, the controller is configured to delete the selected object from the first image.

13. The mobile terminal of claim 6, wherein the controller is configured to control the wireless communication unit to receive at least one of a fifth signal for changing the location of the image of the third piece of furniture in the first image and a sixth signal for rotating the image of the third piece of furniture in the first image from the predetermined external device, and wherein the controller is configured to change the at least one of the location of the image of the third piece of furniture, the size of the image of the third piece of furniture, and the rotation angle of the image of the third piece of furniture in the first image based on at least one of the received fifth and sixth signals.

14. The mobile terminal of claim 13, wherein the controller is configured to display, on the first image, both of the image of the third piece of furniture based on the at least one of the third and fourth signals and the image of the third piece of furniture based on the at least one of the fifth and sixth signals.

15. The mobile terminal of claim 14, wherein at least one of a color, a transparent level, and a pattern of the image of the third piece of furniture in accordance with the at least one of the third and fourth signals is different from that of the image of the third piece of furniture in accordance with the at least one of the fifth and sixth signals.

16. The mobile terminal of claim 6, wherein when detecting a seventh signal for confirming arrangement of the third piece of furniture in the first image, the controller is configured to configure lock so that changes in the location, size, and rotation angle of the image of the third piece of furniture are not allowed.

17. The mobile terminal of claim 16, wherein when detecting the seventh signal for confirming the arrangement of the third piece of furniture in the first image, the controller is configured to display a notification message informing that the arrangement of the third piece of furniture is determined in the chat room of the third area.

18. The mobile terminal of claim 16, wherein when detecting the seventh signal for confirming the arrangement of the third piece of furniture in the first image, the controller is configured to display an indicator on the information of the third piece of furniture, which is displayed in the second area.

19. The mobile terminal of claim 5, wherein the controller is configured to recognize a second text corresponding to a name of the third piece of furniture and a third text corresponding to a specific color from texts displayed in the chat room, and wherein the controller is configured to change a color of the image of the third piece of furniture to the specific color corresponding to the third text.

* * * * *